US012695222B2

(12) United States Patent
Hara et al.

(10) Patent No.: US 12,695,222 B2
(45) Date of Patent: Jul. 28, 2026

(54) BOARD CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Teruo Hara, Mie (JP); Takashi Natsume, Mie (JP); Yicheng Chen, Mie (JP); Shinji Nozaki, Mie (JP); Hiroki Kobayashi, Mie (JP); Sohei Moroki, Mie (JP); Takumi Watanabe, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 290 days.

(21) Appl. No.: 18/564,544

(22) PCT Filed: May 20, 2022

(86) PCT No.: PCT/JP2022/020940
§ 371 (c)(1),
(2) Date: Nov. 27, 2023

(87) PCT Pub. No.: WO2022/259842
PCT Pub. Date: Dec. 15, 2022

(65) Prior Publication Data
US 2024/0380143 A1 Nov. 14, 2024

(30) Foreign Application Priority Data
Jun. 8, 2021 (JP) ................................ 2021-095639

(51) Int. Cl.
*H01R 12/62* (2011.01)
*H01R 12/71* (2011.01)

(52) U.S. Cl.
CPC ........... *H01R 12/62* (2013.01); *H01R 12/716* (2013.01)

(58) Field of Classification Search
CPC .............................. H01R 12/62; H01R 12/716
(Continued)

(56) References Cited

U.S. PATENT DOCUMENTS 5,194,010 A 3/1993 Dambach et al.
5,697,794 A 12/1997 Mosquera
(Continued)

FOREIGN PATENT DOCUMENTS

JP H04-048564 A 2/1992
JP H09-259955 A 10/1997
(Continued)

OTHER PUBLICATIONS

International Search Report issued on Aug. 9, 2022 for WO 2022/259842 A1 (4 pages).

*Primary Examiner* — Gary F Paumen
(74) *Attorney, Agent, or Firm* — Venjuris, P.C.

(57) ABSTRACT

A board connector 1 to be mounted on a circuit board is provided with a connector housing 11, to which a mating connector is connected from a direction parallel to a board surface of the circuit board, a flexible cable 12 including an electrically conductive path 40 extending in a connection direction, a front part 110 in a connection direction of the electrically conductive path 40 being inserted into the connector housing 11 from behind in the connection direction, a rear part 111 in the connection direction of the electrically conductive path 40 being soldered to the circuit board, and a cable holder 14 to be mounted on a rear side in the
(Continued)

connection direction of the connector housing 11. The flexible cable 12 is curved downward by the cable holder 14.

6 Claims, 25 Drawing Sheets

(58) Field of Classification Search
USPC .......................................... 439/77, 499, 495
See application file for complete search history.

(56) References Cited

U.S. PATENT DOCUMENTS

| | | | | |
|---|---|---|---|---|
| 5,779,498 | A * | 7/1998 | Asakawa | H01R 12/79 439/495 |
| 6,109,950 | A * | 8/2000 | Trammel | H01R 12/675 439/76.1 |
| 8,758,030 | B2 * | 6/2014 | Chen | H01R 12/62 439/493 |
| 2015/0126050 | A1 * | 5/2015 | Ma | H01R 12/592 439/83 |
| 2022/0216627 | A1 | 7/2022 | Nishitani et al. | |

FOREIGN PATENT DOCUMENTS

| | | | |
|---|---|---|---|
| JP | H10-312868 | A | 11/1998 |
| JP | 2007-317581 | A | 12/2007 |

* cited by examiner

BOARD CONNECTOR

CROSS REFERENCE TO RELATED APPLICATIONS

This application is a national phase of PCT application No. PCT/JP2022/020940, filed on 20 May 2022, which claims priority from Japanese patent application No. 2021-095639, filed on 8 Jun. 2021, all of which are incorporated herein by reference.

TECHNICAL FIELD

A technique disclosed in this specification relates to a board connector.

BACKGROUND

When an electronic component is mounted on a board, coplanarity between the lower surface of the electronic component and the lower surface of a lead terminal extending in a horizontal direction from the electronic component may become problematic. Specifically, if the lower surface of the lead terminal is at a position higher than the lower surface of the electronic component when the component is mounted on the upper surface of the horizontally placed board, it becomes difficult to bring the lead terminal into contact with an electrode (so-called land) of the board to cause a mounting failure. The mounting failure can be suppressed by correcting the planarity of the lead terminal, but there is a problem that the number of steps increases in that case.

Thus, some of board connectors to be mounted on a board are conventionally known to include a flexible cable instead of lead terminals (see, for example, Patent Document 1). Specifically, a mating connector is connected to a connector described in Patent Document 1 from a direction orthogonal to a board surface of a board, and provided with a holding member having a trapezoidal chevron cross-sectional shape. The flexible cable is bent along the holding member and extends obliquely downward from the lower surface of the connector.

If the flexible cable extends obliquely downward from the lower surface of the connector, the flexible cable is deflected downward due to its own weight and the lower surface of the flexible cable becomes lower than the lower surface of the connector. Thus, the flexible cable more easily contacts the board. Thus, it becomes unnecessary to correct the coplanarity.

PRIOR ART DOCUMENT

Patent Document

Patent Document 1: JP 2020-187834 A

SUMMARY OF THE INVENTION

Problems to be Solved

The mating connector is connected to the connector described in Patent Document 1 from the direction orthogonal to the board surface of the board. A mating connector is connected to some of board connectors from a direction parallel to a board surface of a board. However, problems in the case of applying a flexible cable to the board connector, to which the mating connector is connected from the direction parallel to the board surface of the board, conventionally have not been sufficiently studied.

A technique for making a rear part in a connection direction of an electrically conductive path provided in a flexible cable easily contact a board in a board connector, to which a mating connector is connected from a direction parallel to a board surface of the board is disclosed in this specification.

Means to Solve the Problem

The present disclosure is directed to a board connector with a connector housing, a mating connector being connected to the connector housing from a direction parallel to a board surface of a board, a flexible cable including an electrically conductive path extending in a connection direction, a front part in the connection direction of the electrically conductive path being inserted into the connector housing from behind in the connection direction, a rear part in the connection direction of the electrically conductive path being connected to the board, and a cable holder to be mounted on a rear side in the connection direction of the connector housing, the flexible cable being curved toward the board side by the cable holder if a side where the board is located with respect to the board connector with the board connector mounted on the board surface is defined as the board side.

Effect of the Invention

According to the present disclosure, a rear part in a connection direction of an electrically conductive path provided in a flexible cable easily contacts a board in a board connector, to which a mating connector is connected from a direction parallel to a board surface of the board.

DETAILED DESCRIPTION TO EXECUTE THE INVENTION

Description of Embodiments of Present Disclosure

Figure 1:
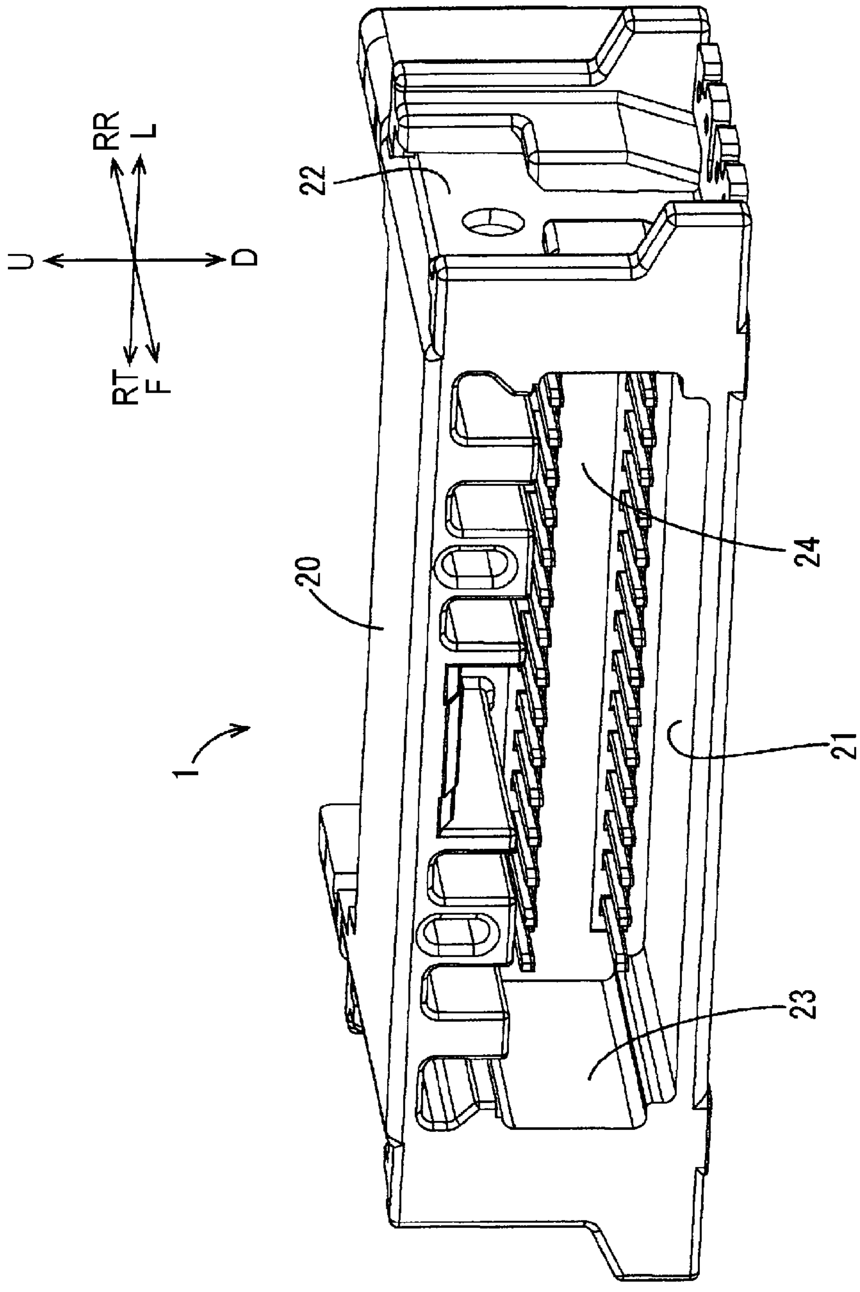
FIG. 1 is a perspective view of a board connector according to a first embodiment when viewed obliquely from a left front side.

First, embodiments of the present disclosure are listed and described.

(1) The board connector according to the present disclosure is provided with a connector housing, a mating connector being connected to the connector housing from a direction parallel to a board surface of a board, a flexible cable including an electrically conductive path extending in a connection direction, a front part in the connection direction of the electrically conductive path being inserted into the connector housing from behind in the connection direction, a rear part in the connection direction of the electrically conductive path being connected to the board, and a cable holder to be mounted on a rear side in the connection direction of the connector housing, the flexible cable being curved toward the board side by the cable holder if a side where the board is located with respect to the board connector with the board connector mounted on the board surface is defined as the board side.

In the case of applying the flexible cable to the board connector, to which the mating connector is connected from the direction parallel to the board surface of the board, it becomes difficult to bring the rear part in the connection direction of the electrically conductive path into contact with the board since the flexible cable extends rearward in the connection direction in parallel to the board from the connector housing.

According to the board connector of the present disclosure, since the flexible cable is bent toward the board side by the cable holder, a rear part in the connection direction of the flexible cable easily contacts the board. Thus, according to the board connector of the present disclosure, the rear part in the connection direction of the electrically conductive path provided in the flexible cable easily contacts the board in the board connector, to which the mating connector is connected from the direction parallel to the board surface of the board.

(2) The cable holder may be constituted by one member, the cable holder may include a path forming portion for forming a cable insertion path, the flexible cable being inserted into the cable insertion path, and the cable insertion path may be entirely open on one side in a direction orthogonal to the connection direction and parallel to the board surface of the board.

According to the board connector of the present disclosure, since the aforementioned one side of the cable insertion path is entirely open, the flexible cable can be bent while the cable holder is constituted by one member by inserting the flexible cable into the cable insertion path from the open side. Thus, the number of components of the cable holder can be reduced as compared to the case where the cable holder is constituted by a plurality of components.

(3) A plurality of the flexible cables disposed apart from each other in a vertical direction may be provided if a direction orthogonal to the board surface of the board with the board connector mounted on the board is defined as the vertical direction, and the cable insertion path may be provided for each flexible cable.

According to the board connector of the present disclosure, the cable holder can be constituted by one member even if there are the plurality of flexible cables.

(4) The cable holder may include a plurality of path forming members disposed apart from each other in a vertical direction and a space between two adjacent ones of the path forming members may be formed as the cable insertion path configured such that the flexible cable is inserted thereinto if a direction orthogonal to the board surface of the board with the board connector mounted on the board is defined as the vertical direction.

According to the board connector of the present disclosure, the rear part in the connection direction of each flexible cable easily contacts the board even if there are the plurality of flexible cables.

(5) The connector housing may include an extension portion extending rearward in the connection direction, and a space between the path forming member and the extension portion may also be formed as the cable insertion path.

According to the board connector of the present disclosure, since the space between the extension portion of the connector housing and the path forming member is also formed as the cable insertion path, the number of the path forming members can be reduced in the case of forming a plurality of the cable insertion paths.

(6) A reinforcement plate may be provided which reinforces a front part in the connection direction of the flexible cable.

The front part in the connection direction of the electrically conductive path resiliently contacts a metal terminal of the mating connector connected to the board connector.

According to the board connector of the present disclosure, since the front part in the connection direction of the flexible cable is reinforced by the reinforcement plate, the front part in the connection direction of the electrically conductive path can be satisfactorily resiliently brought into contact with the metal terminal of the mating connector.

Details of Embodiments of Present Disclosure

Hereinafter, embodiments of the present disclosure are described. The present disclosure is not limited to these illustrations, but is represented by claims and intended to include all changes in the scope of claims and in the meaning and scope of equivalents.

First Embodiment

A first embodiment is described with reference to FIGS. 1 to 14. In the following description, a vertical direction, a front-rear direction and a lateral direction are based on a vertical direction, a front-rear direction and a lateral direction shown in FIG. 1.

The front-rear direction is an example of a connection direction. A front side is an example of a front side in the connection direction, and a rear side is an example of a rear side in the connection direction. The vertical direction is an example of a direction orthogonal to a board surface of a board with a board connector mounted on the board. A lower side is an example of a side where the board is located with respect to the board connector with the board connector mounted on the board. A left side is an example of one side in a direction orthogonal to the connection direction and parallel to the board surface of the board.

In the following description, reference signs of figures may be omitted except some for identical constituent elements.

(1) Board Connector

Figure 2:
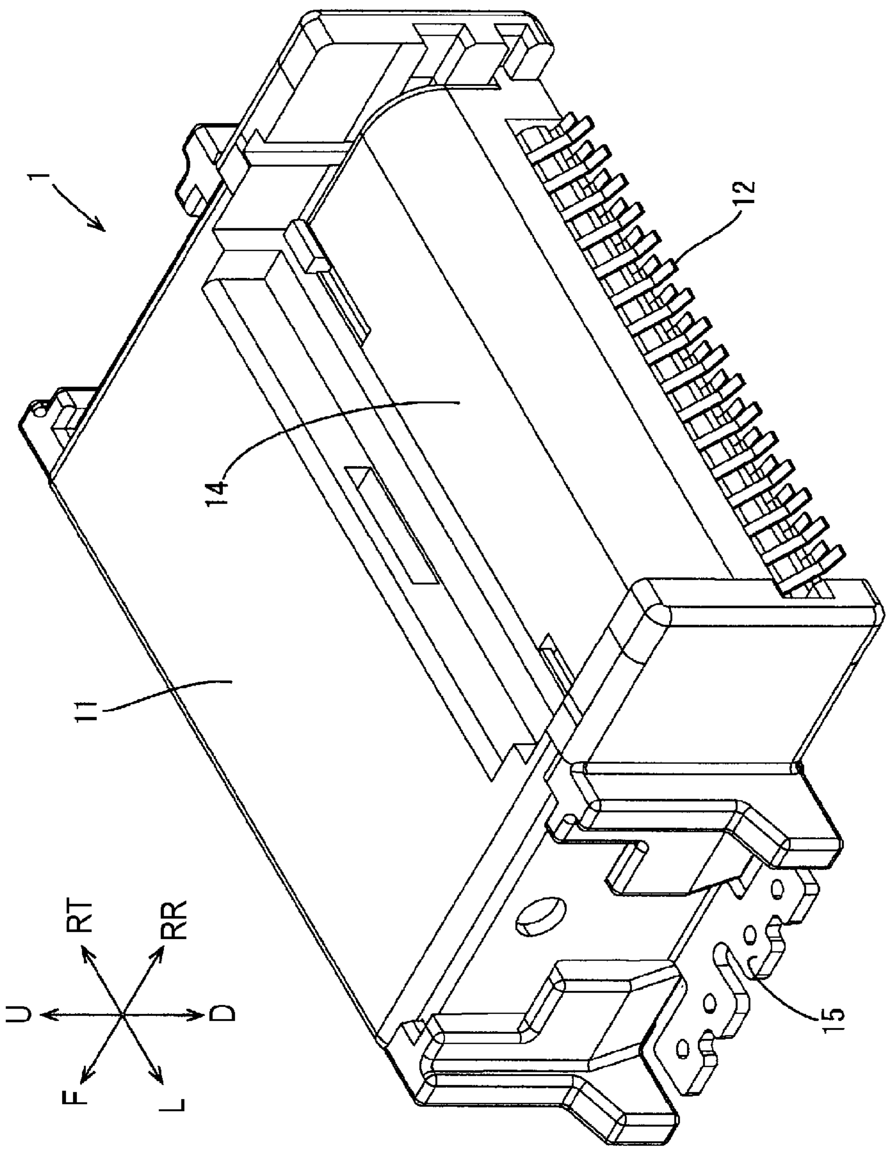
FIG. 2 is a perspective view of the board connector when viewed obliquely from a left rear side.
Figure 3:
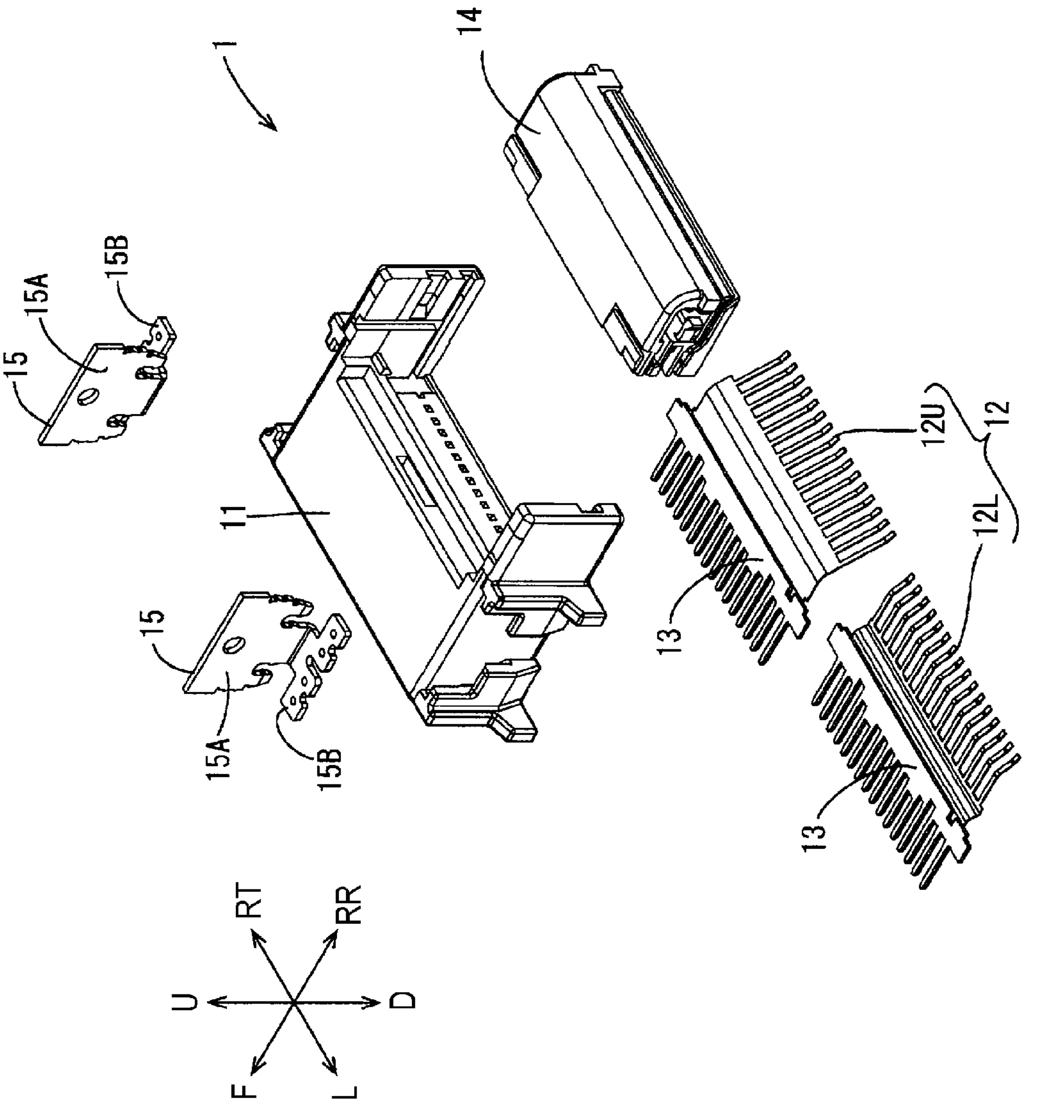
FIG. 3 is an exploded perspective view of the board connector.

With reference to FIGS. 1 to 3, a board connector 1 according to the first embodiment is described. The board connector 1 is to be mounted on a board printed with a circuit (hereinafter, referred to as a circuit board). A mating connector (not shown) is connected to the board connector 1 from a direction parallel to a board surface of the circuit board (from front in FIG. 1) with the board connector 1 mounted on the circuit board.

As shown in FIG. 3, the board connector 1 is provided with a connector housing 11, to which the mating connector is connected, two flexible cables (upper flexible cable 12U and lower flexible cable 12L) disposed vertically apart, two reinforcement plates 13 for reinforcing front parts 112 (see FIG. 9A) in the connection direction of the respective flexible cables 12, a cable holder 14 to be mounted on a rear side in the connection direction of the connector housing 11 and two fixing members 15 for fixing the connector housing 11 to the circuit board.

(1-1) Connector Housing

Figure 4:
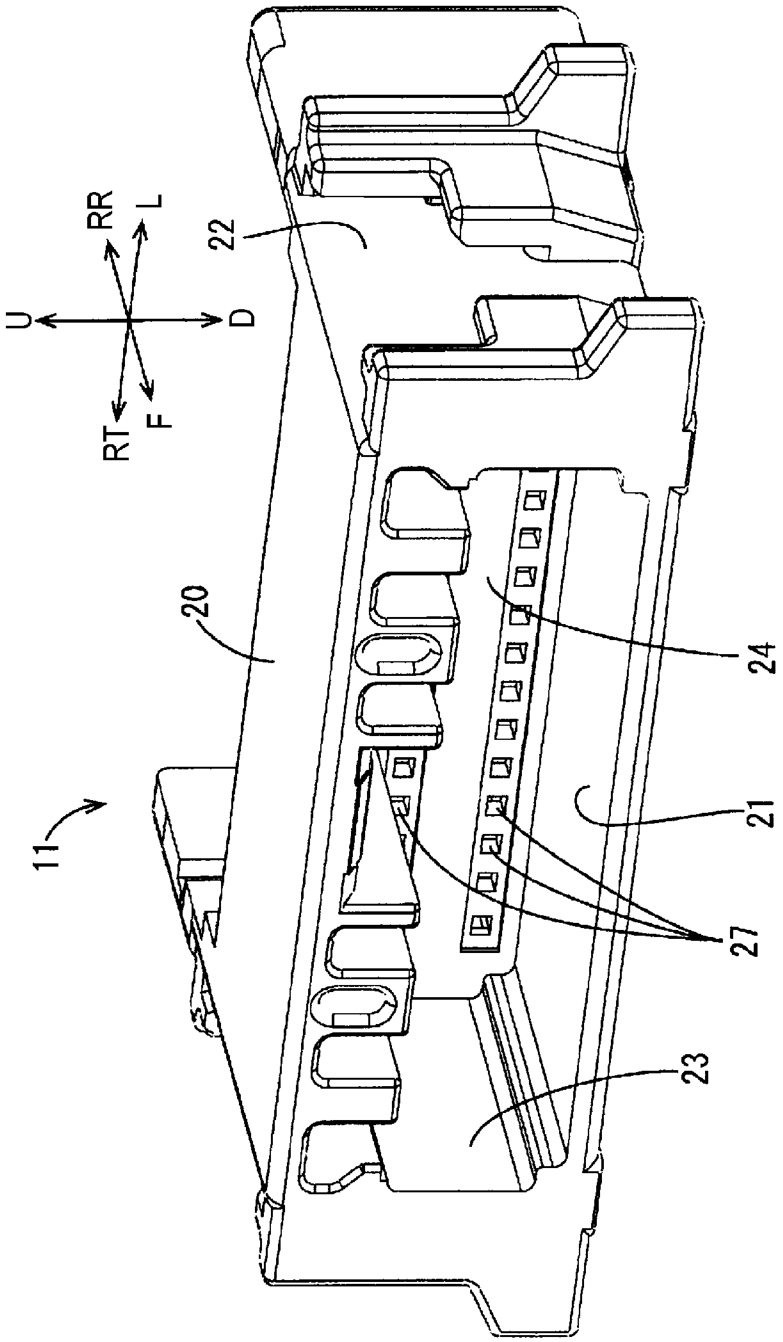
FIG. 4 is a perspective view of a connector housing when viewed obliquely from the left front side.

As shown in FIG. 4, the connector housing 11 is in the form of a rectangular tube including an upper wall 20, a bottom wall 21, a left wall 22, a right wall 23 and a rear wall 24, and open forward.

Figure 5:
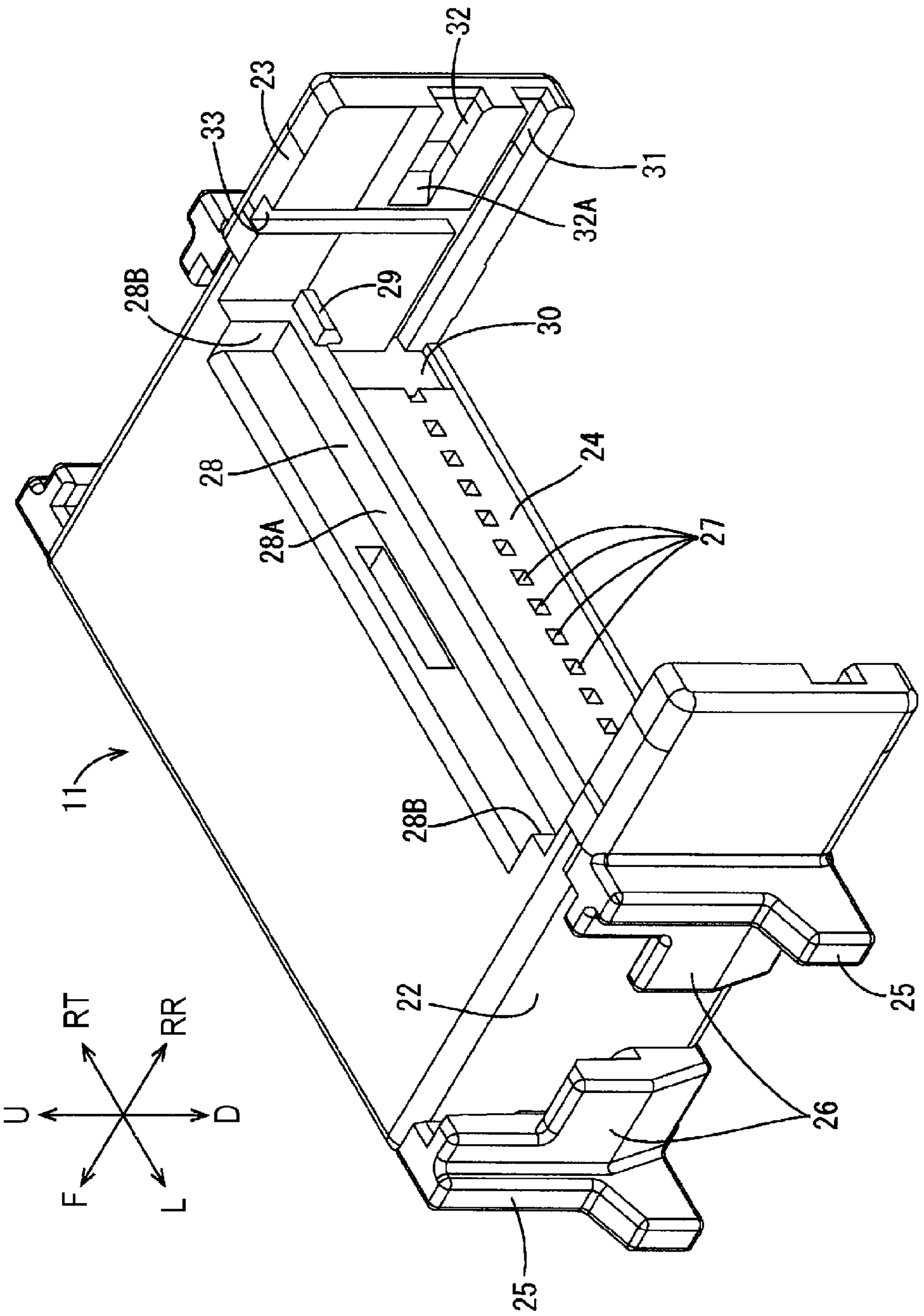
FIG. 5 is a perspective view of the connector housing when viewed obliquely from the left rear side.

As shown in FIG. 5, the left and right walls 22, 23 extend further rearward than the rear wall 24. Parts of the left and right walls 22, 23 extending further rearward than the rear wall 24 constitute a holder mounting portion for mounting the cable holder 14.

A rib 25 extending in the vertical direction is integrally formed along a front edge part of the left wall 22 on the outer surface of the left wall 22. A rib 25 extending in the vertical direction is integrally formed also at a position slightly behind the rear wall 24 on the outer surface of the left wall 22. An interval in the front-rear direction between the front and rear ribs 25 substantially coincides with a width in the front-rear direction of a vertical portion 15A (see FIG. 3) of the fixing member 15 to be described later.

A mounting portion 26 for mounting the fixing member 15 is integrally formed between the two ribs 25. The mounting portion 26 is spaced apart from the left wall 22 by a thickness of the vertical portion 15A of the fixing member 15.

A plurality of terminal insertion holes 27 penetrating in the front-rear direction are formed separately in two upper and lower stages in the rear wall 24. A plurality of the terminal insertion holes 27 of each stage are arranged in a row in the lateral direction. Front parts 110 in the connection direction of electrically conductive paths 40 of the flexible cables 12 to be described later and front parts of the reinforcement plates 13 to be described later are inserted into these terminal insertion holes 27 from behind.

Figure 6:
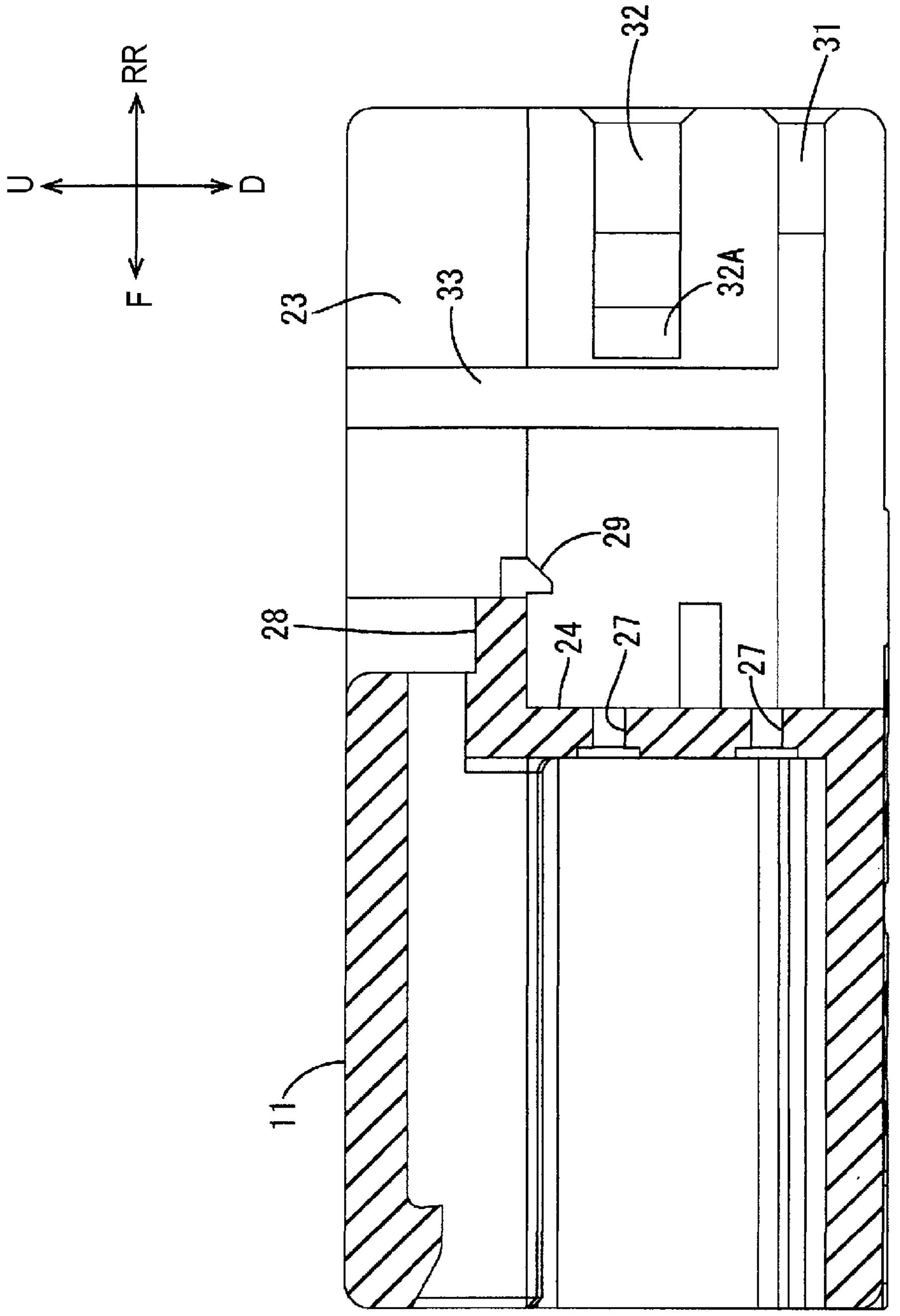
FIG. 6 is a section of the connector housing.

As shown in FIGS. 5 and 6, a protruding portion 28 protruding rearward is integrally formed on the rear surface of the rear wall 24. As shown in FIG. 5, the protruding portion 28 is shaped to include a part 28A extending in the lateral direction and parts 28B rising upward from both left and right sides of the part 28A extending in the lateral direction. Out of the two parts 28B rising upward, the left part 28B is integrated with the left wall 22 and the right part 28B is integrated with the right wall 23.

Figure 7:
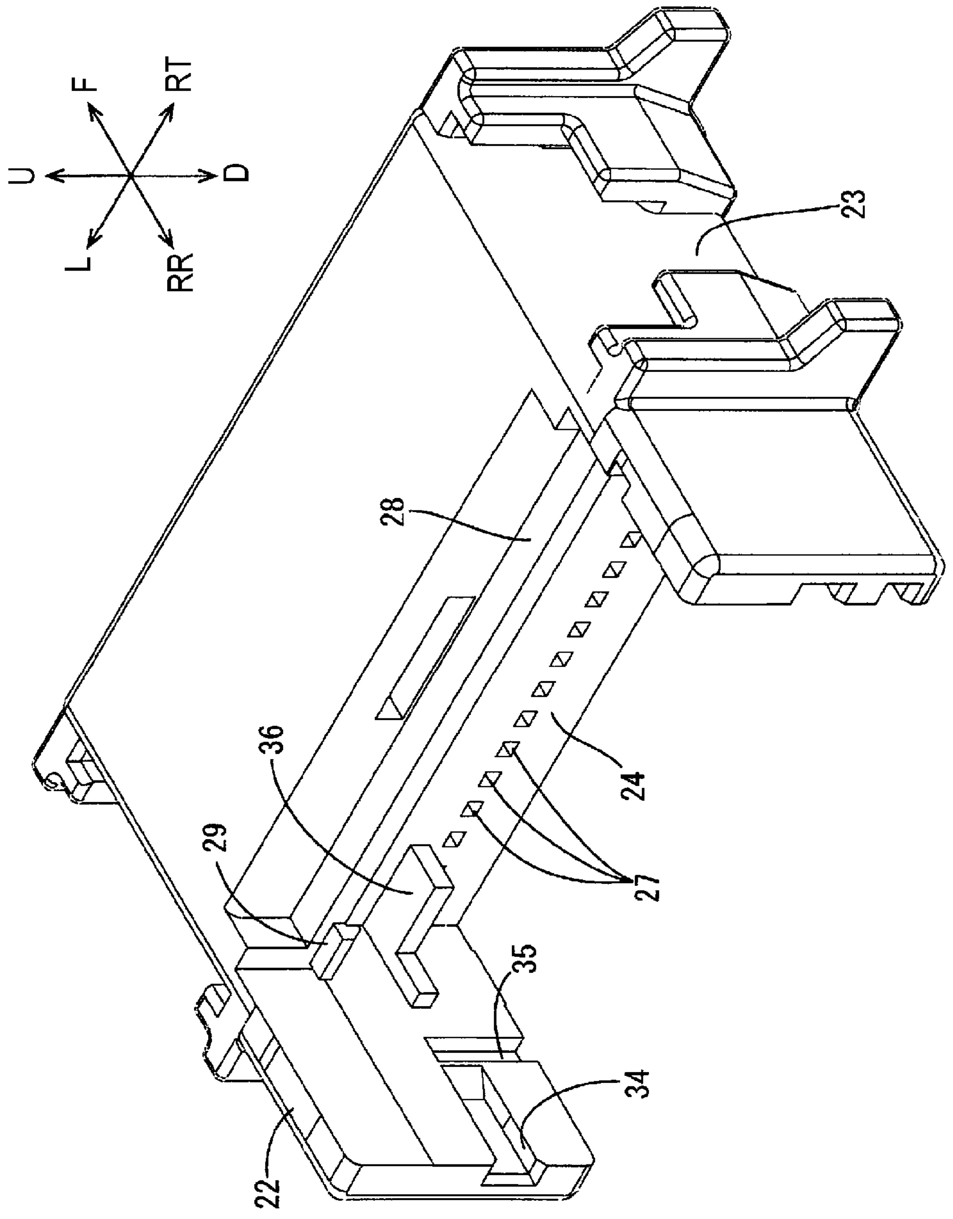
FIG. 7 is a perspective view of the connector housing when viewed obliquely from a right rear side.

As shown in FIGS. 5 and 7, engaging portions 29 are integrally formed on both left and right sides of the rear surface of the protruding portion 28. The lower ends of the engaging portions 29 are located below the lower surface of the protruding portion 28. Lower rear corner parts of the engaging portions 29 are chamfered.

As shown in FIG. 5, a recess 30 recessed forward is formed in a right part of the rear surface of the rear wall 24.

A first horizontal groove 31 extending forward from the rear end of the right wall 23 is formed in the inner surface of the right wall 23. The front end of the first horizontal groove 31 reaches the rear wall 24. A second horizontal groove 32 extending forward from the rear end of the right wall 23 is formed above the first horizontal groove 32 in the inner surface of the right wall 23. A length in the front-rear direction of the second horizontal groove 32 is shorter than that of the first horizontal groove 31. A wall surface 32A on a front side of the second horizontal groove 32 is formed into a slant surface. A first vertical groove 33 extending downward from the upper end of the right wall 23 is formed in front of the second horizontal groove 32 in the inner surface of the right wall 23. The lower end of the first vertical groove 33 is connected to the first horizontal groove 31.

As shown in FIG. 7, a third horizontal groove 34 extending forward from the rear end of the left wall 22 is formed in the inner surface of the left wall 22. A length in the front-rear direction of the third horizontal groove 34 coincides with that of the second horizontal groove 32. However, the third horizontal groove 34 is provided at a position lower than the second horizontal groove 32. A second vertical groove 35 extending upward from the lower end of the left wall 22 is formed in front of the third horizontal groove 34 in the inner surface of the left wall 22. The position of the upper end of the second vertical groove 35 substantially coincides with that of the upper end of the third horizontal groove 34.

A protruding portion 36 protruding and L-shaped in a top view is integrally formed on a corner part between the inner surface of the left wall 22 and the rear surface of the rear wall 24. The L-shaped protruding portion 36 is provided between the upper terminal insertion holes 27 and the lower terminal insertion holes 27.

(1-2) Fixing Member

As shown in FIG. 3, the fixing member 15 is an L-shaped member formed by bending a flat plate made of metal and stamped into a predetermined shape. The fixing member 15 includes the vertical portion 15A having plate surfaces facing in a horizontal direction and a horizontal portion 15B having plate surfaces facing in the vertical direction. The fixing member 15 is inserted into the mounting portion 26 of the connector housing 11. The horizontal portion 15B is soldered to the circuit board. The connector housing 11 is fixed to the circuit board by soldering the horizontal portions 15B to the circuit board.

(1-3) Flexible Cable

Figure 8:
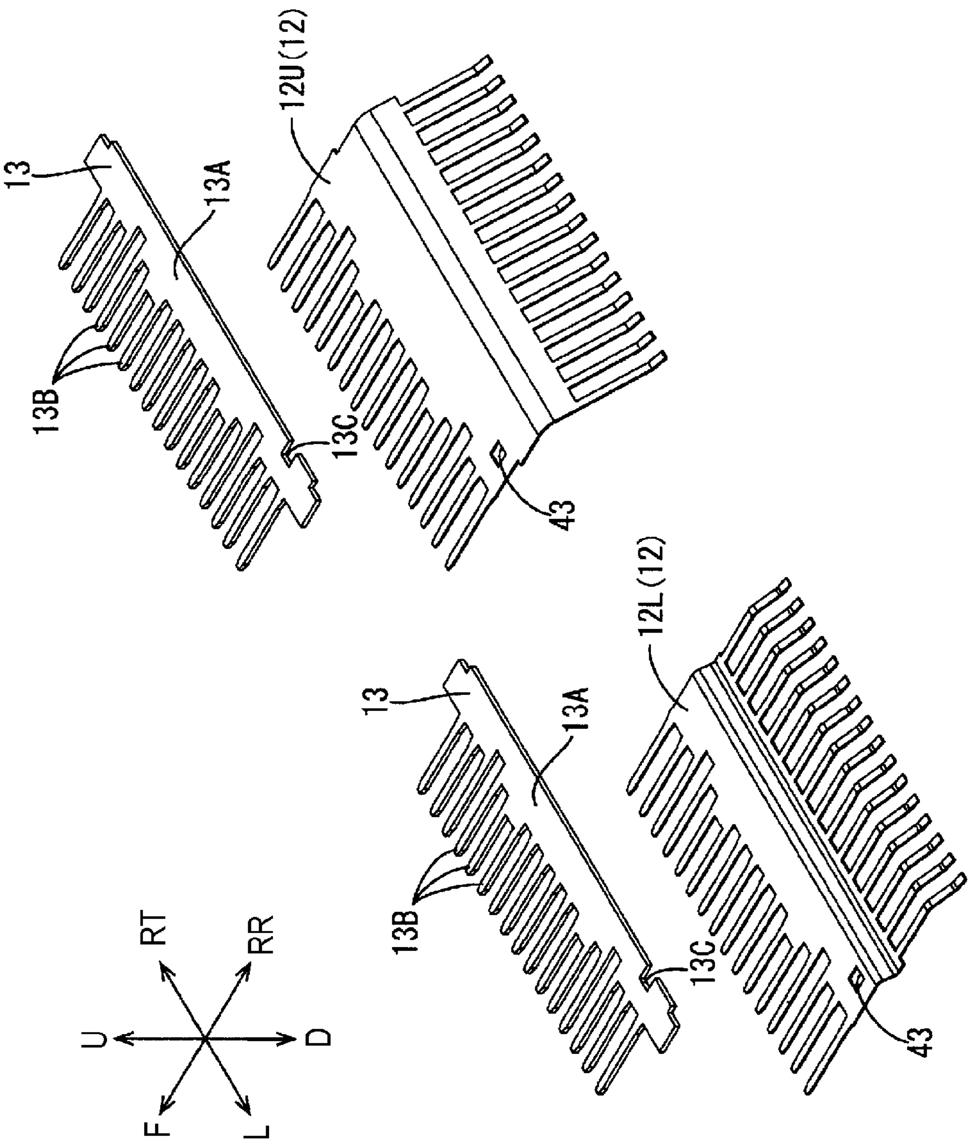
FIG. 8 is a perspective view of flexible cables and reinforcement plates.

The flexible cable 12 is described with reference to FIG. 8. The flexible cable 12 is a cable illustrated as a FFC (Flexible Flat Cable) or FPC (Flexible Printed Circuits). The flexible cable 12 has flexibility (deformability) to be easily deformable in response to an external force.

Figure 9A:
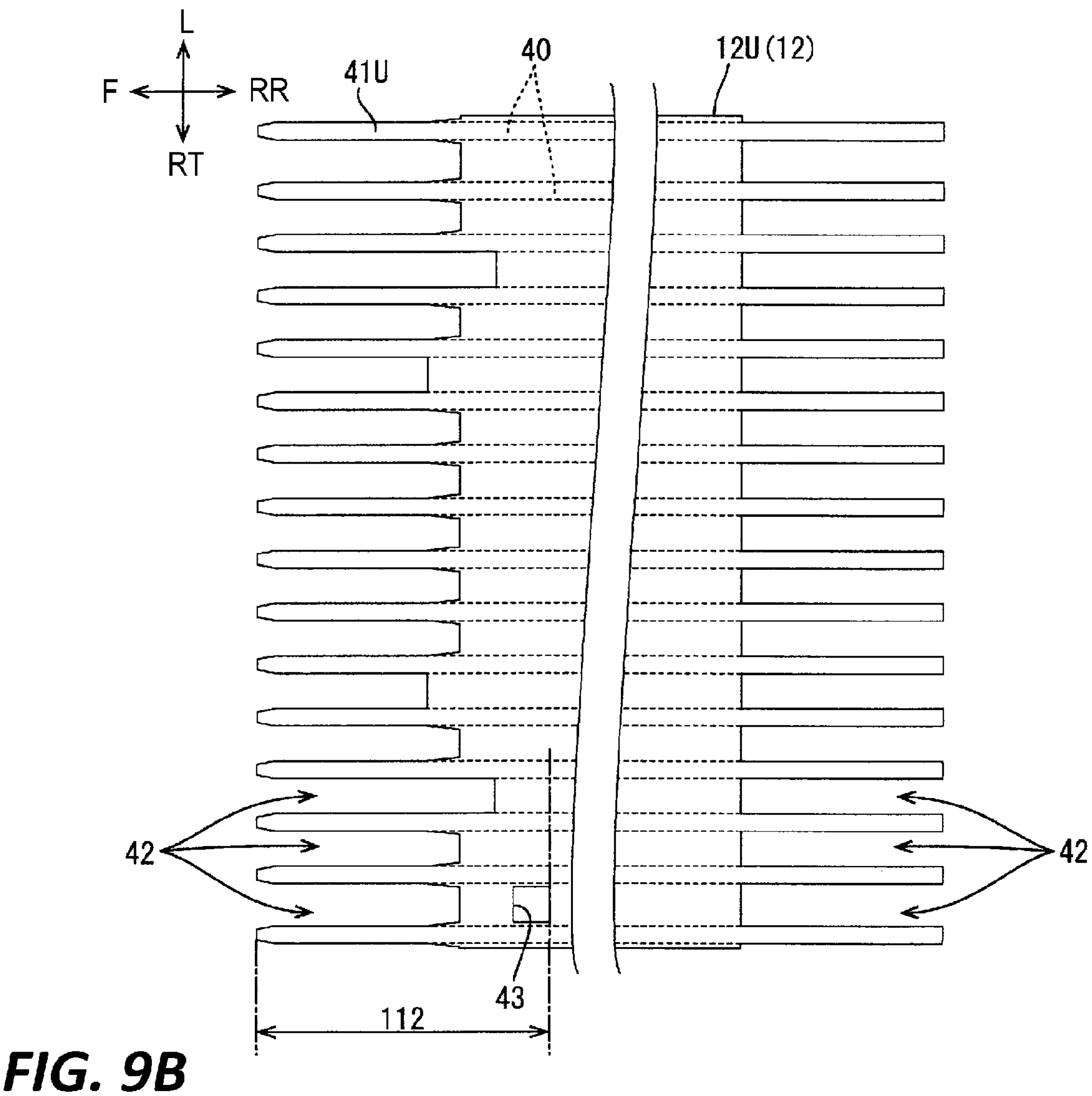
FIG. 9A is a top view of the flexible cable.
Figure 9B:
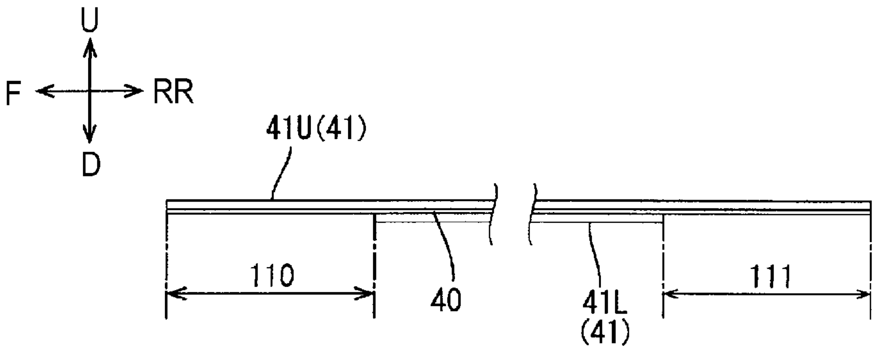
FIG. 9B is a side view of the flexible cable.

As schematically shown in FIGS. 9A and 9B, the flexible cable 12 includes a plurality of the electrically conductive paths 40 made of metal and extending in parallel to each other and two films 41 (upper film 41U and lower film 41L) made of insulating resin and vertically sandwiching and holding those electrically conductive paths 40.

As shown in FIG. 9A, a front part of the upper film 41U is cut between adjacent ones of the electrically conductive paths 40. The rear ends of third cuts 42 from the left and right are located rearward of those of other cuts 42. A rear part of the upper film 41U is also cut between adjacent ones of the electrically conductive paths 40.

As shown in FIG. 9B, the lower surfaces of the front parts 110 in the connection direction and the lower surfaces of rear parts 111 in the connection direction of the electrically conductive paths 40 are not covered by the lower film 41L. The front part 110 of each electrically conductive path 40 is inserted into the terminal insertion hole 27 of the connector housing 11, and the lower surface of the rear part 111 is soldered to an electrode (so-called land) on the circuit board.

The flexible cable 12 is formed with a vertically penetrating through hole 43. The through hole 43 is formed at a position right below a recess 13C of the reinforcement plate 13 to be described later.

(1-4) Reinforcement Plate

The reinforcement plate 13 is described with reference to FIG. 8. The reinforcement plate 13 is formed of a resin material such as a polyimide resin or glass epoxy resin. The reinforcement plate 13 is bonded to the upper surface of the flexible cable 12 by an adhesive.

The reinforcement plate 13 includes a plate-like base portion 13A extending in the lateral direction behind the rear ends of the front cuts 42 of the flexible cable 12 and parts 13B extending forward in correspondence with the respective electrically conductive paths 40 from the front end of the base portion 13A. A width in the lateral direction of the base portion 13A is larger than that of the flexible cable 12. The recess 13C recessed forward is formed at a position between two adjacent electrically conductive paths 40 in a rear end part of the base portion 13A.

The parts of the reinforcement plate 13 extending forward in correspondence with the respective electrically conductive paths 40 are inserted into the front parts 110 of the electrically conductive paths 40 and the terminal insertion holes 27 of the connector housing 11.

(1-5) Cable Holder

The cable holder 14 is described with reference to FIGS. 10 and 11. The cable holder 14 is for bending the flexible cables 12 downward (board side) by being mounted on the rear side of the connector housing 11. The cable holder 14 according to the first embodiment is constituted by one member.

The cable holder 14 is roughly a rectangular parallelepiped long in the lateral direction, and a rear upper corner part is chamfered to form a curved surface 14A (convex curved surface when viewed from the lateral direction).

Figure 10:
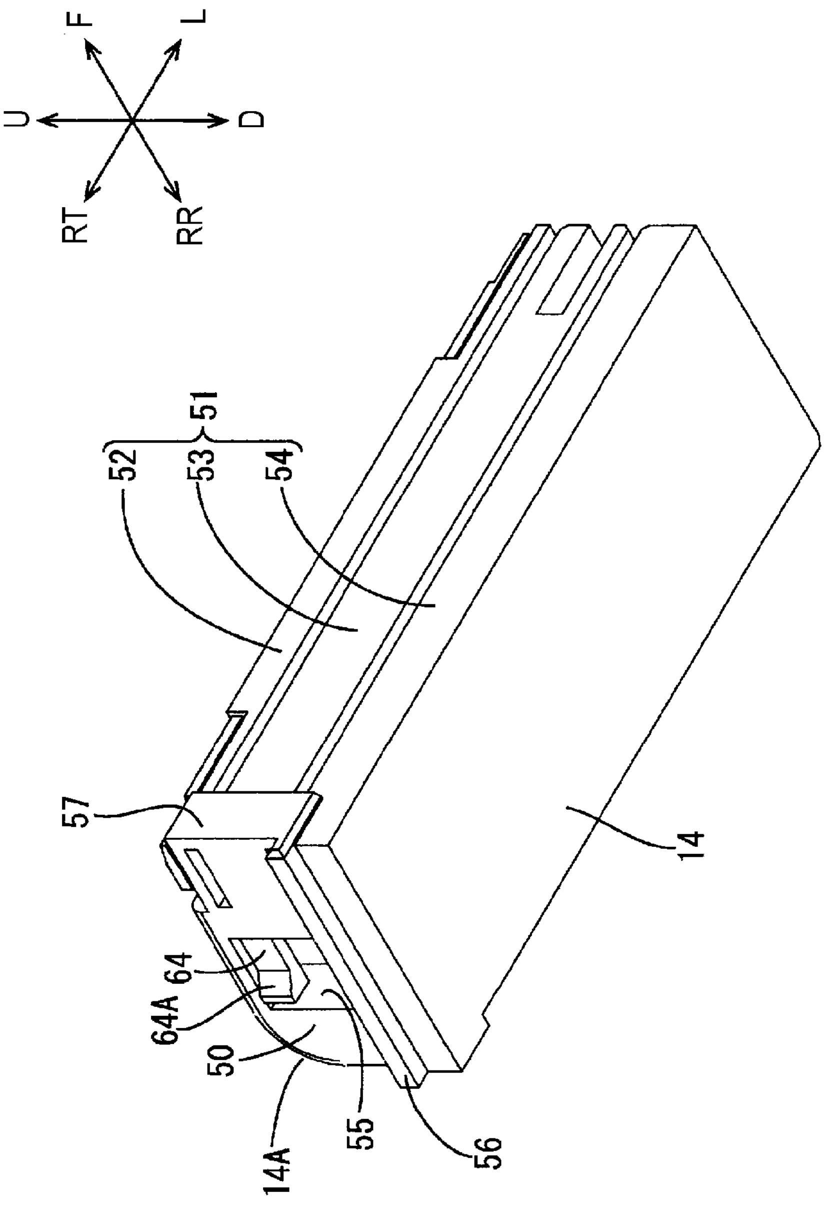
FIG. 10 is a perspective view of a cable holder when viewed obliquely from a right front side.

As shown in FIG. 10, the cable holder 14 includes a right wall 50 and a path forming portion 51 extending leftward from the right wall 50. The path forming portion 51 is for forming cable insertion paths 70 (see FIG. 12), into which the flexible cables 12 are inserted. As shown in FIGS. 10 and 11, the path forming portion 51 is composed of three forming portions including an upper forming portion 52, an intermediate forming portion 53 and a lower forming portion 54.

As shown in FIG. 10, the right wall 50 is formed with a rectangular through hole 55 penetrating in the lateral direction. A guide portion 56 protruding rightward and extending in the front-rear direction is integrally formed below the through hole 55 on the outer surface of the right wall 50. The guide portion 56 is inserted into the first horizontal groove 31 of the right wall 23 of the connector housing 11 from behind and guides the cable holder 14 forward. A part of the right wall 50 of the cable holder 14 above the lower surface of the guide portion 56 slightly protrudes forward. In the following description, this part is referred to as a protruding portion 57. The protruding portion 57 is fit into the recess 30 formed in the rear wall 24 of the connector housing 11.

Figure 12:
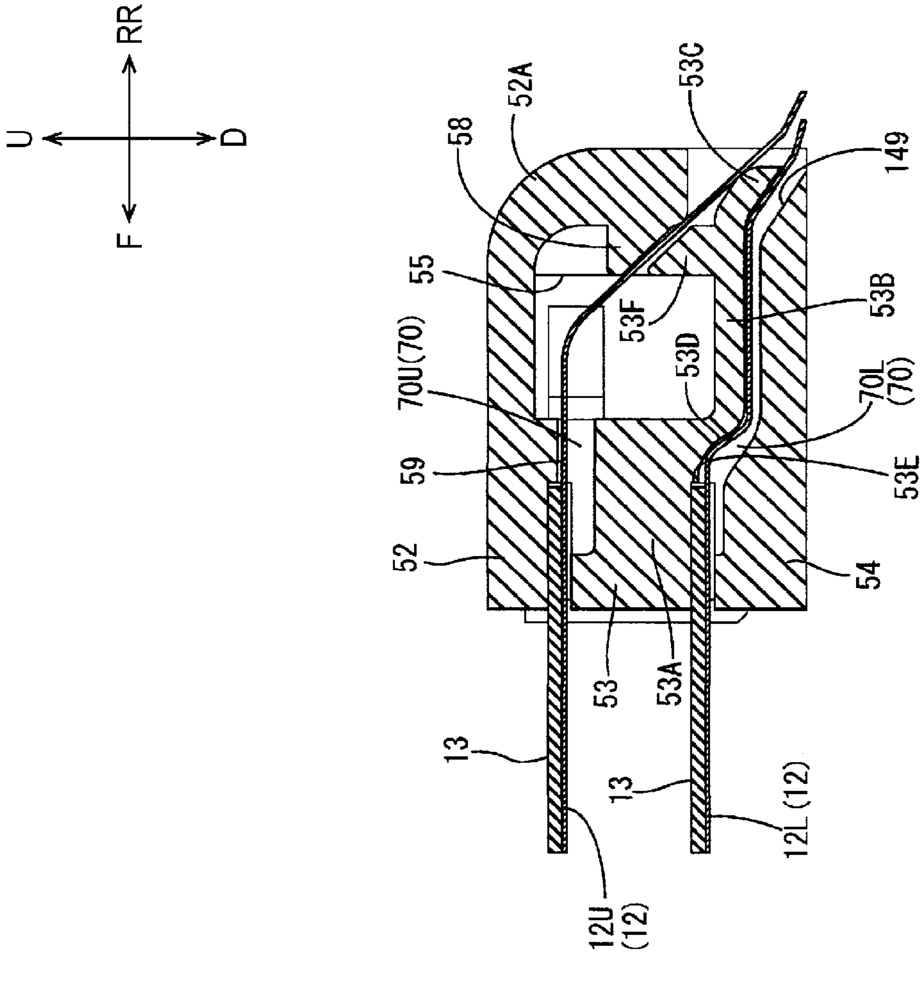
FIG. 12 is a section of the cable holder.

As shown in FIG. 12, the upper forming portion 52 is formed above the through hole 55. The intermediate forming portion 53 is formed below the through hole 55. The upper and intermediate forming portions 52, 53 are formed to avoid the through hole 55 when viewed from the lateral direction.

An upper cable insertion path 70U, into which the upper flexible cable 12U is inserted, is formed between the upper and intermediate forming portions 52, 53. A lower cable insertion path 70L, into which the lower flexible cable 12L is inserted, is formed between the intermediate and lower forming portions 53, 54. As shown in FIG. 11, left sides of these cable insertion paths 70 are entirely open. The two flexible cables 12 are respectively inserted into the cable insertion paths 70 from the left.

As shown in FIG. 12, a rear end part 52A of the upper forming portion 52 is curved downward. A triangular protrusion 58 is formed over an entire width in the lateral direction on a forward facing surface of the rear end part 52A. The triangular protrusion 58 is formed into a right-angled triangular shape having an oblique side inclined forward toward an upper side when viewed from the lateral direction. A step portion 59 is formed at a position in front of a center in the front-rear direction on the lower surface of the upper forming portion 52. The step portion 59 restricts a rearward movement of the reinforcement plate 13.

Figure 11:
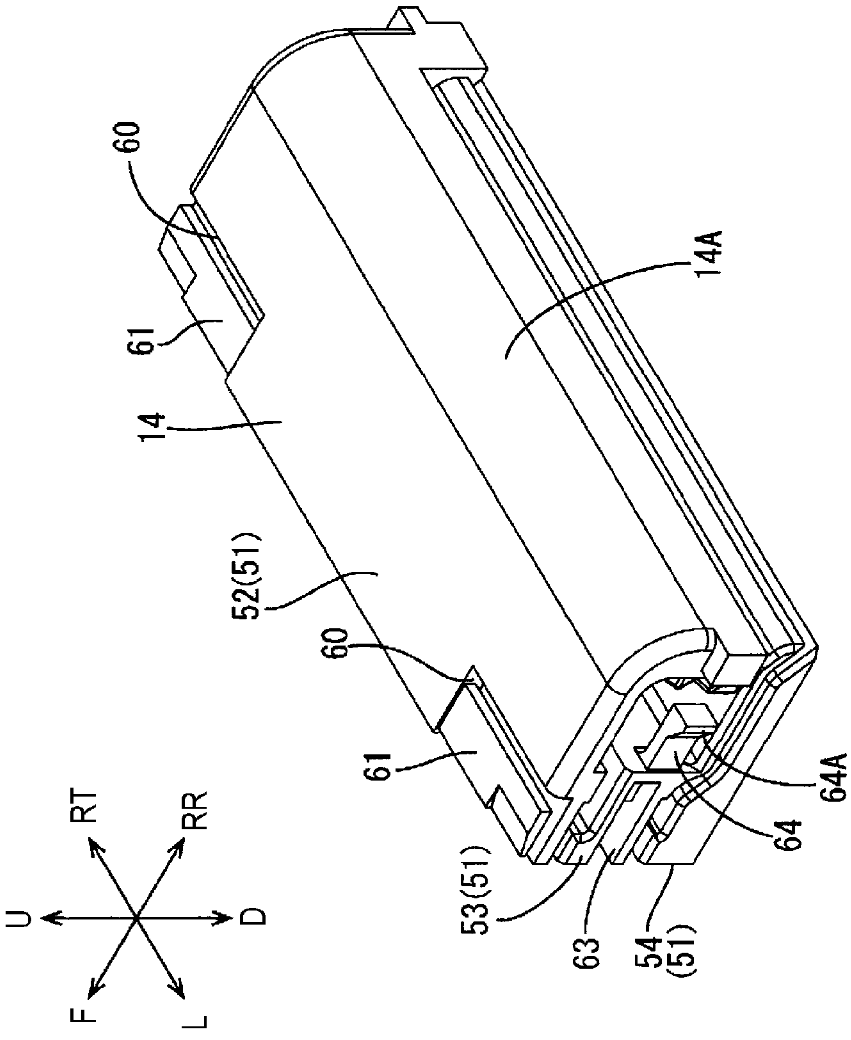
FIG. 11 is a perspective view of the cable holder when viewed obliquely from the left rear side.

As shown in FIG. 11, an upper front corner part of the upper forming portion 52 is rectangularly cut on both left and right sides to form recesses 60. An engaging portion 61 in the form of a flat plate extending leftward is integrally formed on a leftward facing surface of the left recess 60. An upper side of a left front corner part of the flat plate-like engaging portion 61 is chamfered to form a slant surface. The engaging portion 29 formed on the protruding portion 28 of the rear wall 24 of the connector housing 11 is engaged with the flat plate-like engaging portion 61. The right recess 60 is also similar and integrally formed with a flat plate-like engaging portion 61.

Figure 13:
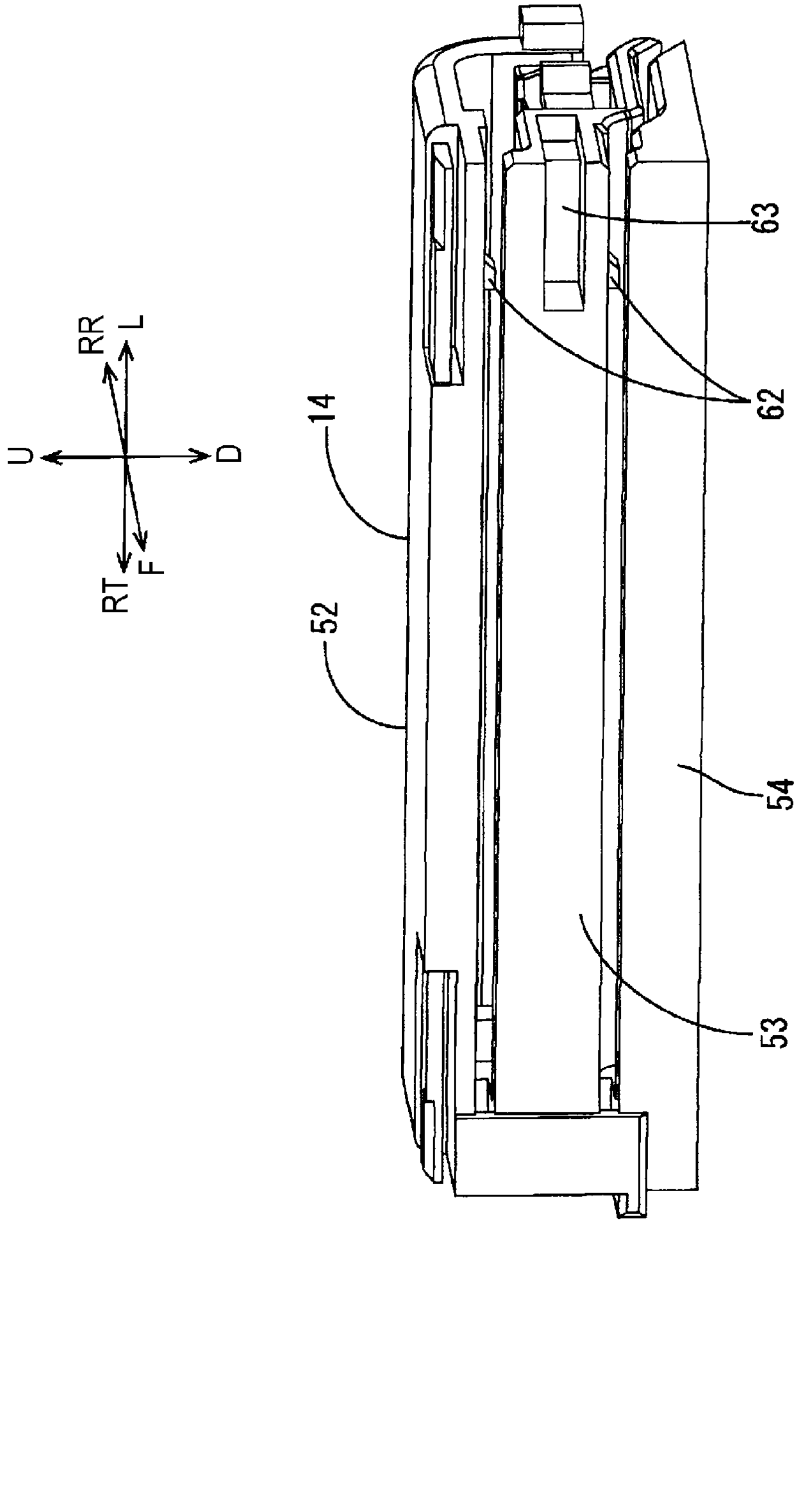
FIG. 13 is a perspective view of the cable holder when viewed obliquely from the left front side.

As shown in FIG. 13, an engaging projection 62 to be fit into the recess 13C formed in the reinforcement plate 13 and the through hole 43 formed in the flexible cable 12 is formed on the lower surface of the upper forming portion 52. Since the flexible cable 12 is inserted into the cable insertion path 70 from the left as described above, a left corner part of the engaging projection 62 is chamfered.

As shown in FIG. 12, the intermediate forming portion 53 includes a rectangular part 53A rectangular when viewed from the lateral direction, a flat plate-like portion 53B in the form of a flat plate extending rearward from a rear edge part of the lower surface of the rectangular part 53A and an inclined part 53C inclined rearward and downward from a rear side of the flat plate-like portion 53B.

A slant surface 53D inclined upward toward the front is formed on a front end part of the lower surface of the flat plate-like portion 53B. A step 53E is formed at the front end of the flat plate-like portion 53B. The step 53E restricts a rearward movement of the reinforcement plate 13 of the lower flexible cable 12L. A triangular protrusion 53F extending in the lateral direction is integrally formed on a rear end part of the upper surface of the flat plate-like portion 53B. The triangular protrusion 53F is formed over an entire width in the lateral direction. The triangular protrusion 53F is formed into a right-angled triangular shape having an oblique side inclined forward toward an upper side when viewed from the lateral direction.

As shown in FIGS. 11 and 13, a recess 63, into which the L-shaped protruding portion 36 of the connector housing 11 is fit, is formed on a front left corner part of the rectangular part 53A of the intermediate forming portion 53. The recess 63 is formed to have substantially the same shape as the L-shaped protruding portion 36.

As shown in FIGS. 10 and 11, engaging arms 64 are integrally formed on both left and right sides of a rearward facing surface of the rectangular part 53A of the intermediate forming portion 53. The engaging arm 64 extends rearward from a rearward facing surface of the rectangular part 53A. The left and right engaging arms 64 are vertically shifted. As shown in FIG. 11, an engaging projection 64A is integrally formed on a rear end part of the outer surface of the left engaging arm 64. A front corner part of the engaging projection 64A is chamfered. The engaging projection 64A is engaged with the second vertical groove 35 of the left wall 22 of the connector housing 11. The right engaging arm 64 has the same shape as the left engaging arm 64. An engaging projection 64A of the right engaging arm 64 is engaged with the first vertical groove 33 of the right wall 23 of the connector housing 11.

As shown in FIG. 13, an engaging projection 62 to be fit into the recess 13C formed in the reinforcement plate 13 and the through hole 43 formed in the lower flexible cable 12L is also formed on the lower surface of the rectangular part 53A of the intermediate forming portion 53. The engaging projection 62 of the intermediate forming portion 53 has the same shape as the engaging projection of the upper forming portion 52.

As shown in FIG. 12, the upper surface of the lower forming portion 54 is shaped substantially in conformity with the lower surface of the intermediate forming portion 53. A slant surface 149 inclined downward toward the rear side is formed on an upper rear corner part of a rear end part of the lower forming portion 54.

(2) Assembling Process of Board Connector

An assembling process of the board connector 1 is described with reference to FIG. 14.

(Step 1) The upper flexible cable 12U and the reinforcement plate 13 are inserted into the upper cable insertion path 70U of the cable holder 14 from the left.

(Step 2) The lower flexible cable 12L and the reinforcement plate 13 are inserted into the lower cable insertion path 70L of the cable holder 14 from the left. The order of Steps 1 and 2 may be reversed.

(Step 3) The cable holder 14 having the flexible cables 12 and the reinforcement plates 13 inserted therein is mounted into the connector housing 11 from behind.

(3) Bending of Flexible Cables by Cable Holder

Figure 14:
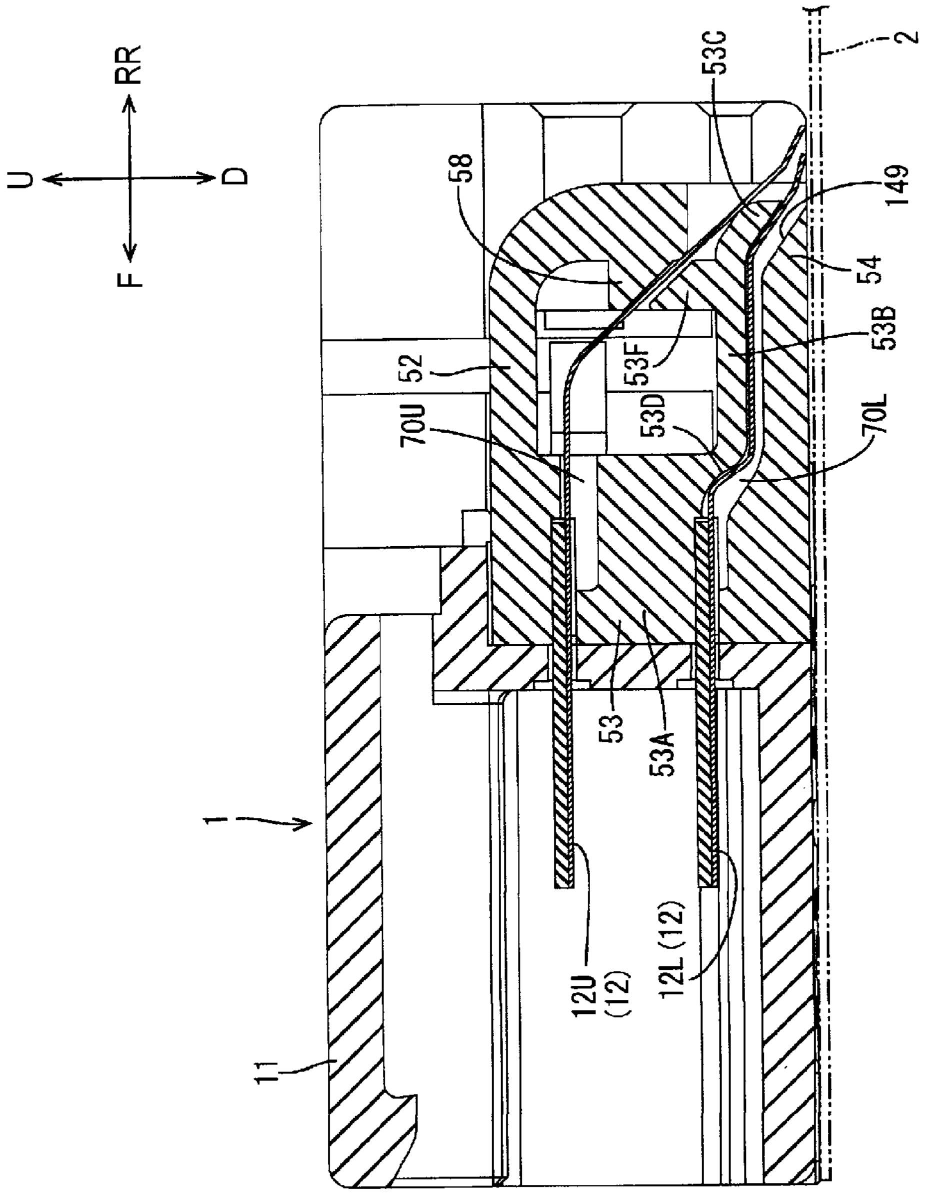
FIG. 14 is a section of the board connector.

As shown in FIG. 14, when the board connector 1 is assembled, the upper flexible cable 12U is obliquely bent to a rear lower side (board side) and pulled out from the board connector 1 by passing between the slant surface of the triangular protrusion 58 of the upper forming portion 52 and the slant surface of the triangular protrusion 53F of the intermediate forming portion 53.

The lower flexible cable 12L is obliquely bent to the rear lower side along the slant surface 53D of the flat plate-like portion 53B of the intermediate forming portion 53 after extending rearward between the rectangular part 53A of the intermediate forming portion 53 and the lower forming portion 54. The obliquely bent lower flexible cable 12L extends rearward between the flat plate-like portion 53B of the intermediate forming portion 53 and the lower forming portion 54, is obliquely bent to the rear lower side and pulled out from the board connector 1 by passing between the inclined part 53C of the intermediate forming portion 53 and the slant surface 149 of the rear end part of the lower forming portion 54.

If the board connector 1 is lifted up by a mounting machine to mount the board connector 1 on the circuit board, the rear part 11 of the upper flexible cable 12U and the rear part 111 of the lower flexible cable 12L are deflected downward due to their own weights, whereby the lower surfaces of the rear parts 111 become lower than the lower surface of the board connector 1. Thus, the rear parts 111 easily contact the circuit board.

(4) Effects of Embodiment

According to the board connector 1, since the flexible cables 12 are bent downward (board side) by the cable holder 14, the rear parts in the connection direction of the flexible cables 12 (more specifically, the rear parts 111 of the electrically conductive paths 40) easily contact the circuit board. Thus, a step of correcting coplanarity becomes unnecessary.

According to the board connector 1, since the left sides of the cable insertion paths 70 are entirely open in the cable holder 14, the flexible cables 12 can be bent while the cable holder 14 is constituted by one member by inserting the flexible cables 12 into the cable insertion paths 70 from the left. Thus, the number of components of the cable holder 14 can be reduced as compared to the case where the cable holder 14 is constituted by a plurality of components.

According to the board connector 1, since the cable holder 14 is provided with the cable insertion path 70 for each flexible cable 12, the cable holder 14 can be constituted by one member even if there are the plurality of flexible cables 12.

According to the board connector 1, since the front parts 112 in the connection direction of the flexible cables 12 are reinforced by the reinforcement plates 13, the front parts 110 in the connection direction of the electrically conductive paths 40 satisfactorily resiliently contact metal terminals of the mating connector.

Second Embodiment

A second embodiment is described using FIGS. 15 to 25.

(1) Board Connector

Figure 15:
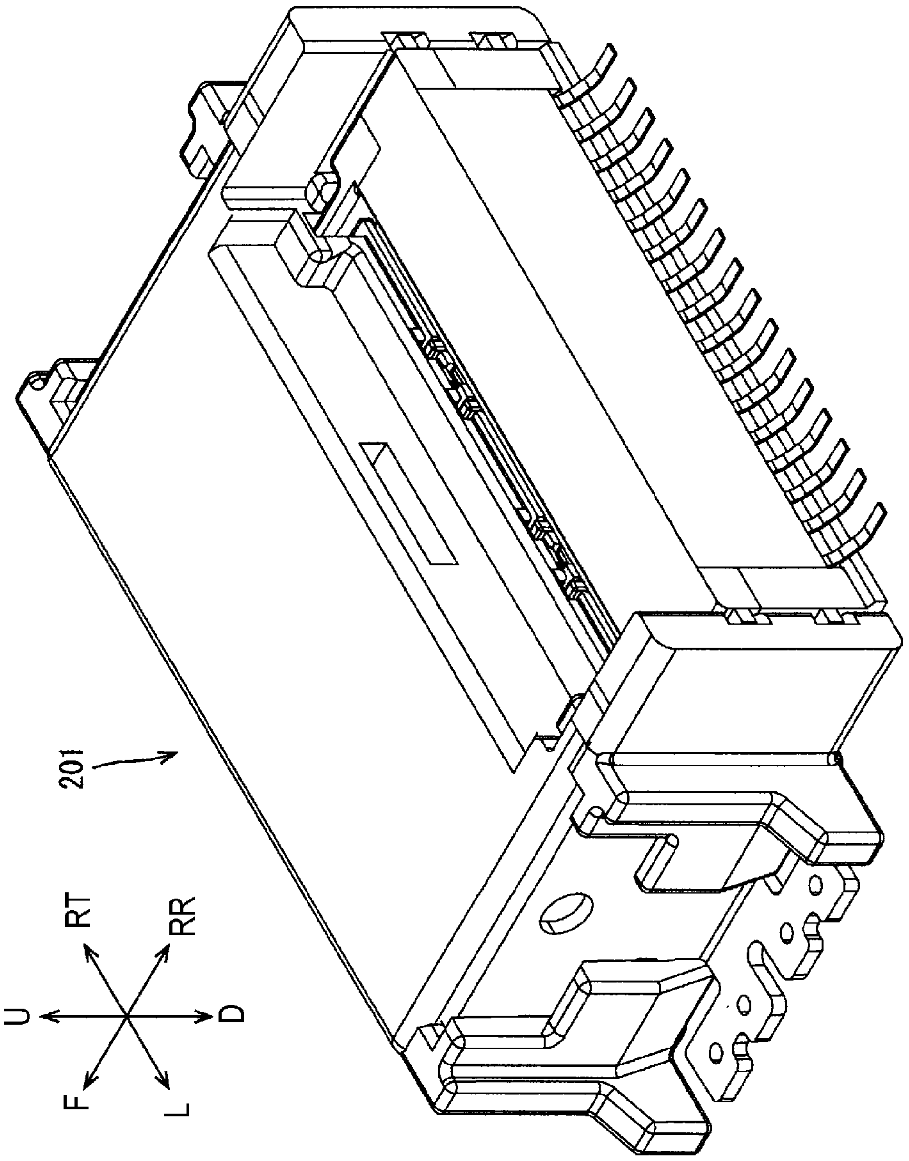
FIG. 15 is a perspective view of a board connector according to a second embodiment when viewed obliquely from a left rear side.
Figure 16:
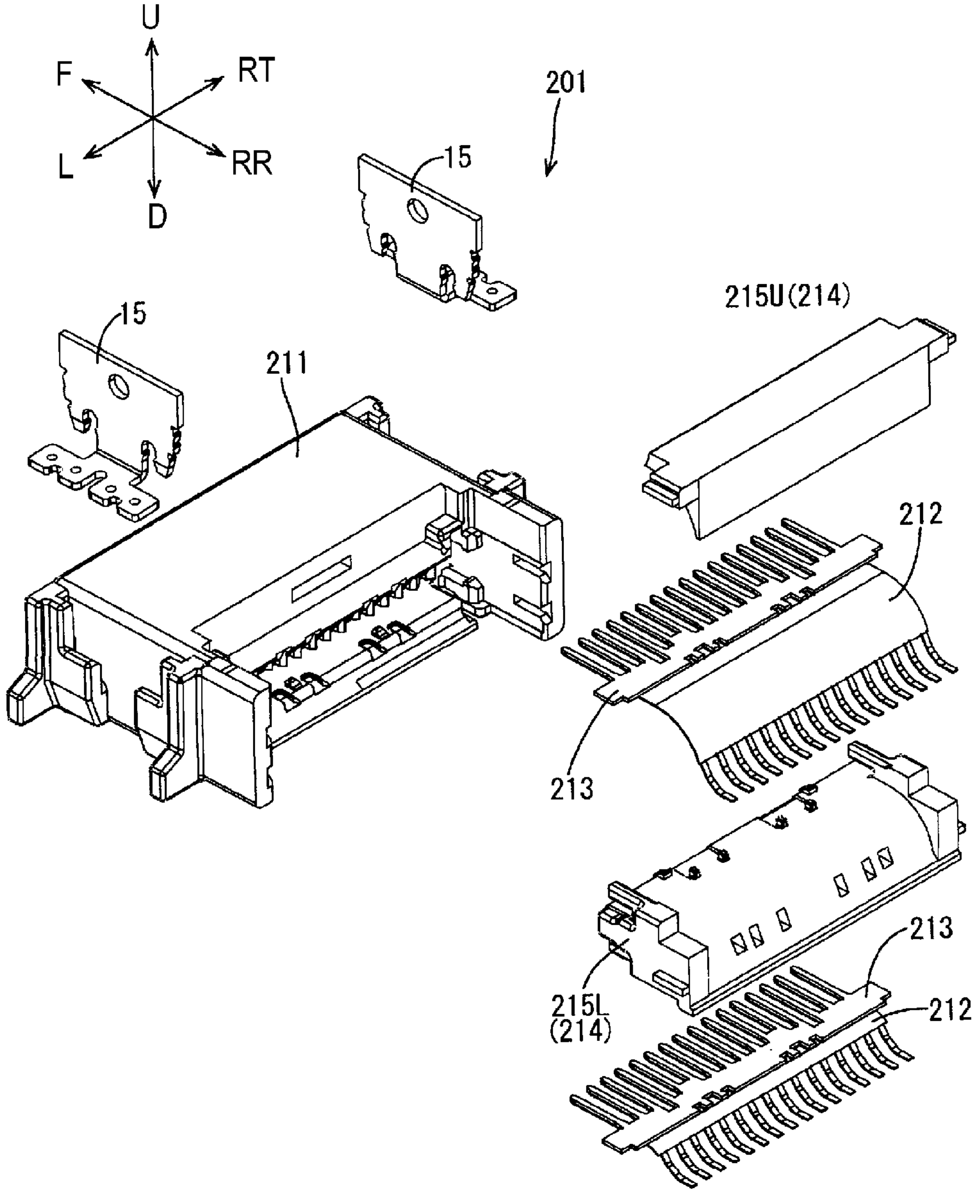
FIG. 16 is an exploded perspective view of the board connector.

With reference to FIGS. 15 and 16, a board connector 201 according to the second embodiment is described. A mating connector is also connected to the board connector 201 from a direction parallel to a board surface of a circuit board. As shown in FIG. 16, a cable holder 214 is composed of two members (upper forming member 215U, lower forming member 215L) in the board connector 201.

(1-1) Flexible Cable

Figure 17:
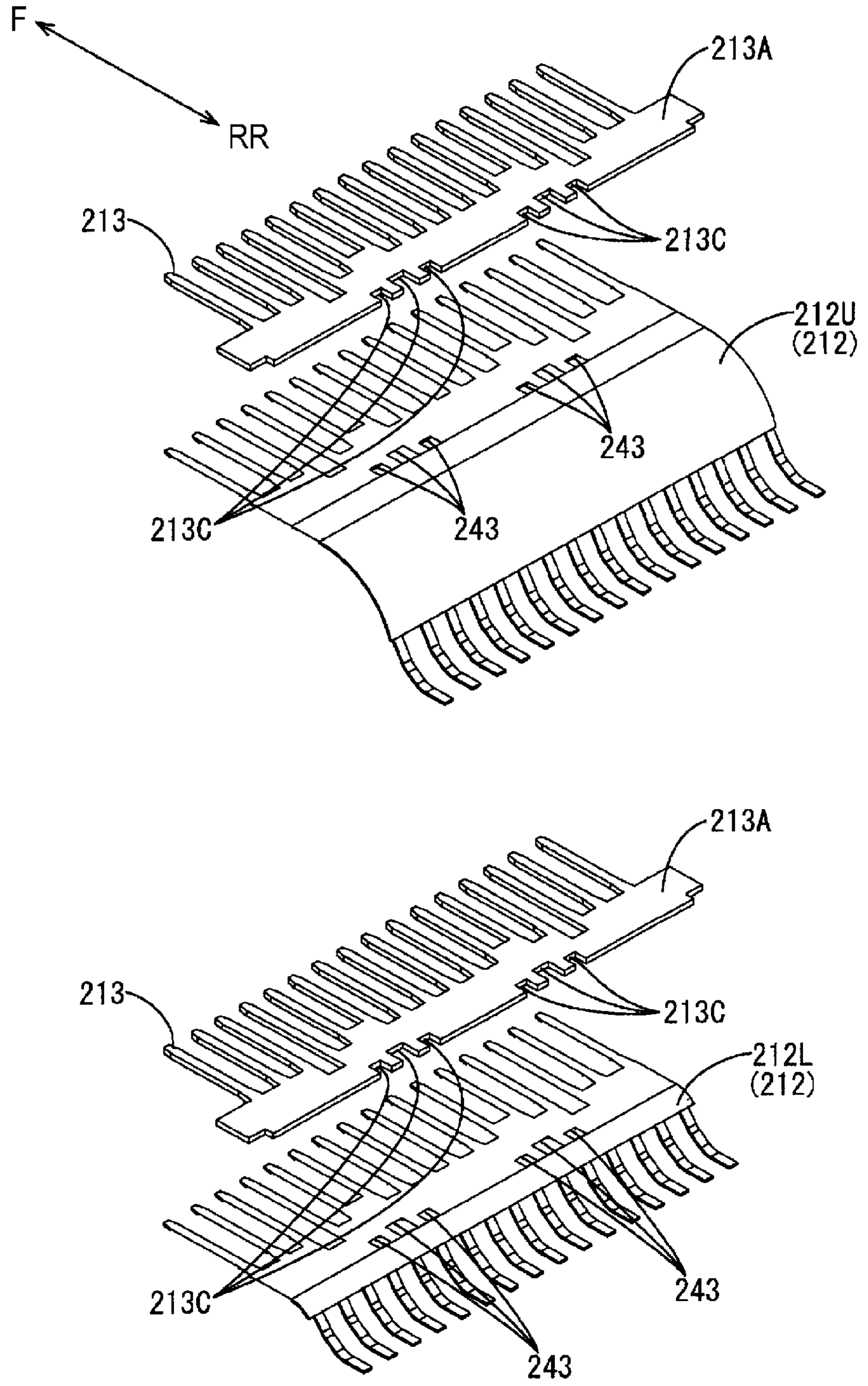
FIG. 17 is a perspective view of flexible cables and reinforcement plates.

As shown in FIG. 17, a flexible cable 212 according to the second embodiment is similar to the flexible cable 12 according to the first embodiment, but differs therefrom in the number and positions of through holes 243. The flexible cable 212 is formed with three through holes 243 on a left side and three through holes 243 on a right side with respect to a center in the lateral direction. The front end of the middle through hole 243, out of the three through holes 243, is located forward of those of the other two through holes 243.

(1-2) Reinforcing Plate

A reinforcement plate 213 according to the second embodiment is similar to the reinforcement plate 13 according to the first embodiment, but differs therefrom in the number and positions of recesses 213C formed in the rear end of a base portion 213A. The base portion 213A is formed with three recesses 213C on a left side and three recesses 213C on a right side with respect to a center in the lateral direction. The three recesses 213C are formed at positions right above the three through holes 243 of the flexible cable 212.

(1-3) Connector Housing

Figure 18:
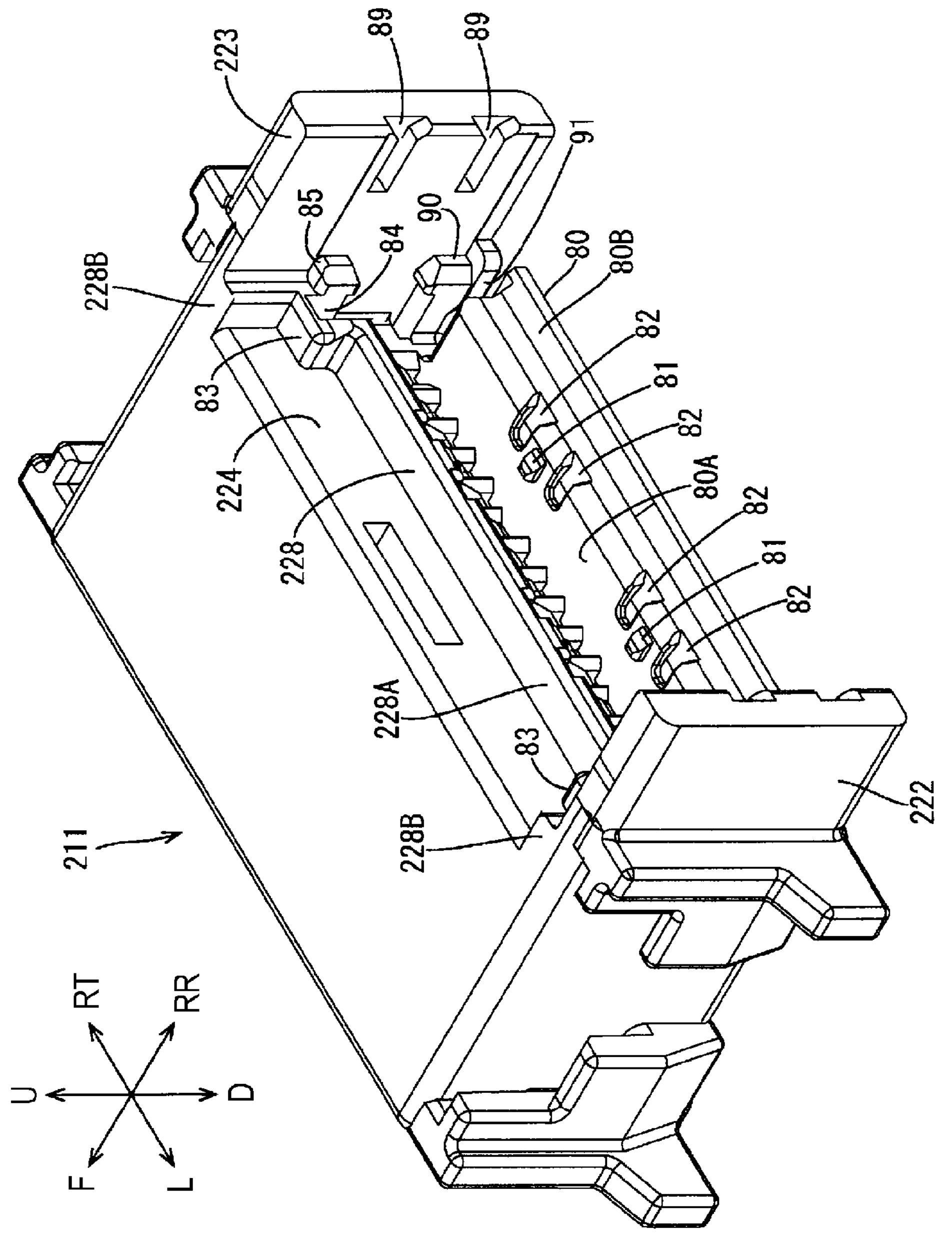
FIG. 18 is a perspective view of a connector housing when viewed obliquely from the left rear side.

As shown in FIG. 18, a connector housing 211 according to the second embodiment is provided with an extension portion 80 substantially in the form of a plate extending rearward along a lower edge part of a rear wall 224. The right end of the extension portion 80 does not reach a right wall 223 and is separated from the right wall 223. The left end of the extension portion 80 is similar and separated from a left wall 222. The upper surface of the extension portion 80 has a flat surface 80A and a curved surface 80B (concave curved surface) connected to the rear end of the flat surface 80A.

Two laterally spaced-apart projections 81 are formed in front of the curved surface 80B on the upper surface of the extension portion 80. Rear corner parts of the projections 81 are chamfered. The projection 81 is fit into the middle recess 213C, out of the aforementioned three recesses 213C of the reinforcement plate 213 of the lower flexible cable 212L, and the through hole 243 formed in the lower flexible cable 212L in correspondence with that recess 213C. A pair of recesses 82 open rearward are formed on both left and right sides of each projection 81.

Figure 19:
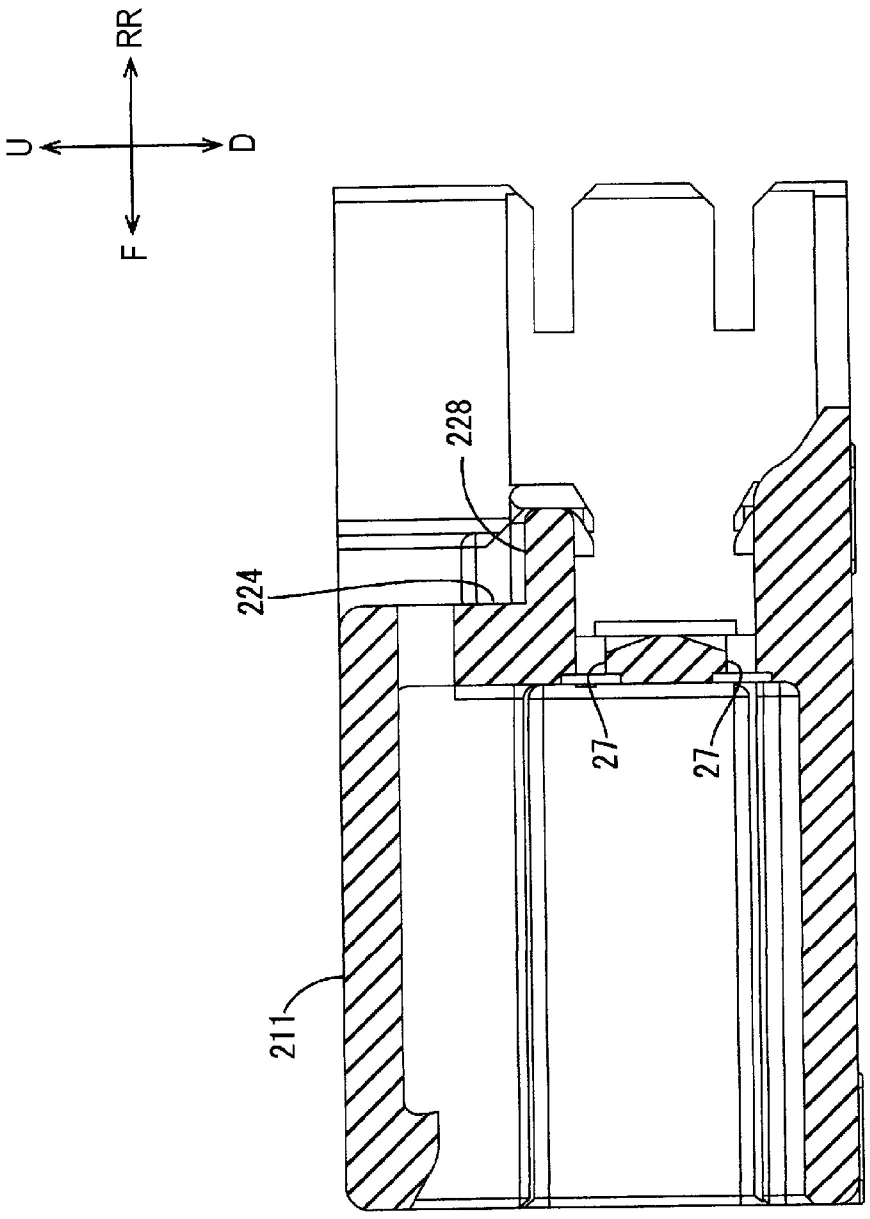
FIG. 19 is a section of the connector housing.

As shown in FIG. 19, a plate-like protruding portion 228 protruding rearward is also integrally formed on the rear wall 224 of the connector housing 211 according to the second embodiment. As shown in FIG. 18, the protruding portion 228 is shaped to include a part 228A extending in the lateral direction and parts 228B extending upward from both left and right sides of the part 228A extending in the lateral direction. The protruding portion 228 is formed with step portions 83 on corner parts between the part 228A extending in the lateral direction and the upward extending parts 228B. A groove 84 extending in the front-rear direction is formed in the lower surface of the step portion 83. An upper extending portion 106 of the cable holder 214 to be described later is inserted into the groove 84.

A protruding portion 85 protruding rearward is integrally formed on a lower end part of the upward extending part 228B.

Figure 20:
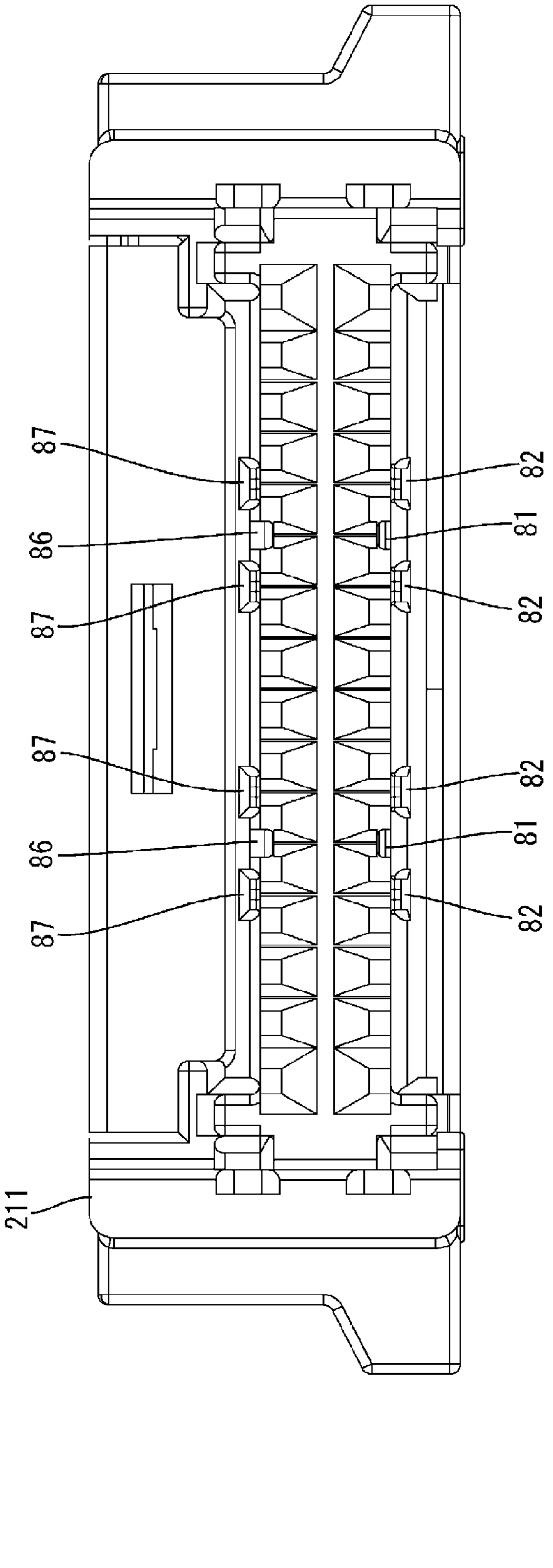
FIG. 20 is a back view of the connector housing.

As shown in FIG. 20, the lower surface of the protruding portion 228 is formed with projections 86 and recesses 87 in correspondence with the projections 81 and the recesses 82 formed in the upper surface of the extension portion 80. The projection 86 is fit into the middle recess 213C, out of the aforementioned three recesses 213C of the reinforcement plate 213 of the upper flexible cable 212U and the through hole 243 formed in the upper flexible cable 212U in correspondence with that recess 213C.

The shape of the inner surface of the right wall 223 is described with reference to FIG. 18. Two horizontal grooves 89 extending forward from the rear end of the right wall 223 are formed in the inner surface of the right wall 223 while being vertically spaced apart. A protruding portion 90 having a substantially rectangular parallelepiped shape and extending in the front-rear direction is integrally formed on a front lower corner when viewed from the left on the inner surface of the right wall 223. A groove 91 extending in the front-rear direction is formed between the right end of the extension portion 80 and the protruding portion 90. A lower extending portion 106 of the cable holder 214 to be described later is inserted into the groove 91. The inner surface of the left wall 222 and that of the right wall 223 are plane-symmetrically shaped.

(1-4) Cable Holder

As shown in FIG. 16, the cable holder 214 according to the second embodiment is composed of two path forming members 215 (upper forming member 215U, lower forming member 215L) disposed apart from each other in the vertical direction.

Figure 23:
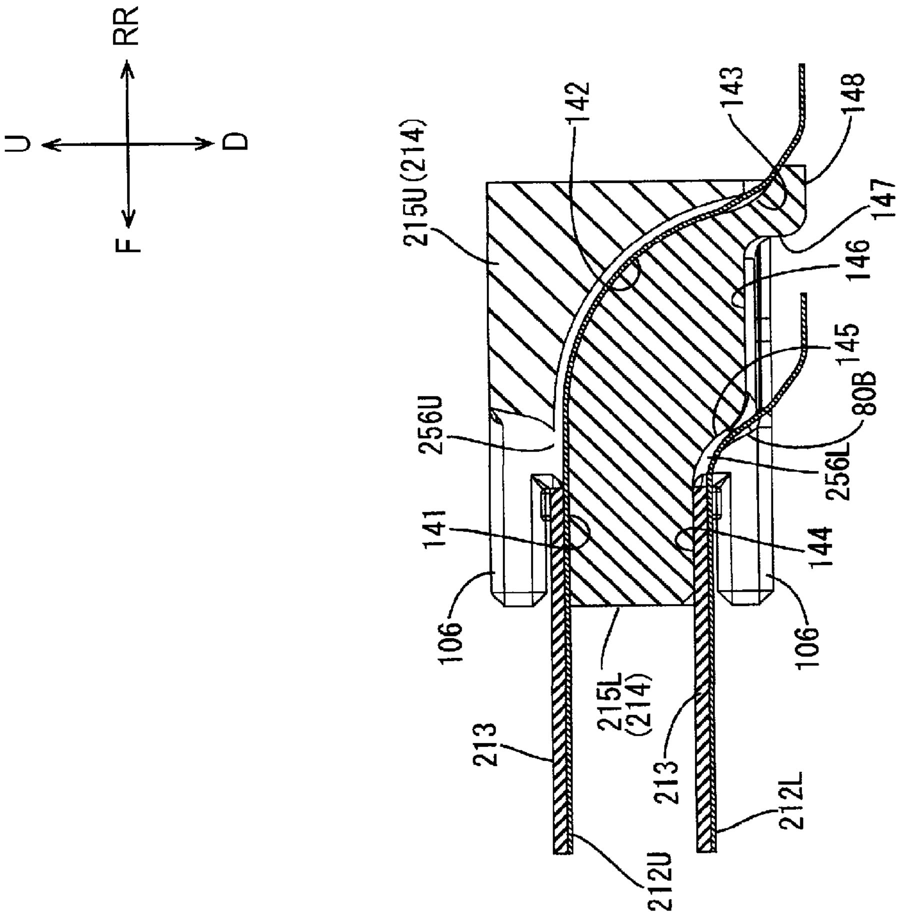
FIG. 23 is a section of the cable holder.

As shown in FIG. 23, a space between the two path forming members 215 is formed as an upper cable insertion path 256U in the cable holder 214. Although the connector housing 211 is not shown in FIG. 23, a space between the lower forming member 215L and the extension portion 80 of the connector housing 211 is formed as a lower cable insertion path 256L.

Figure 21:
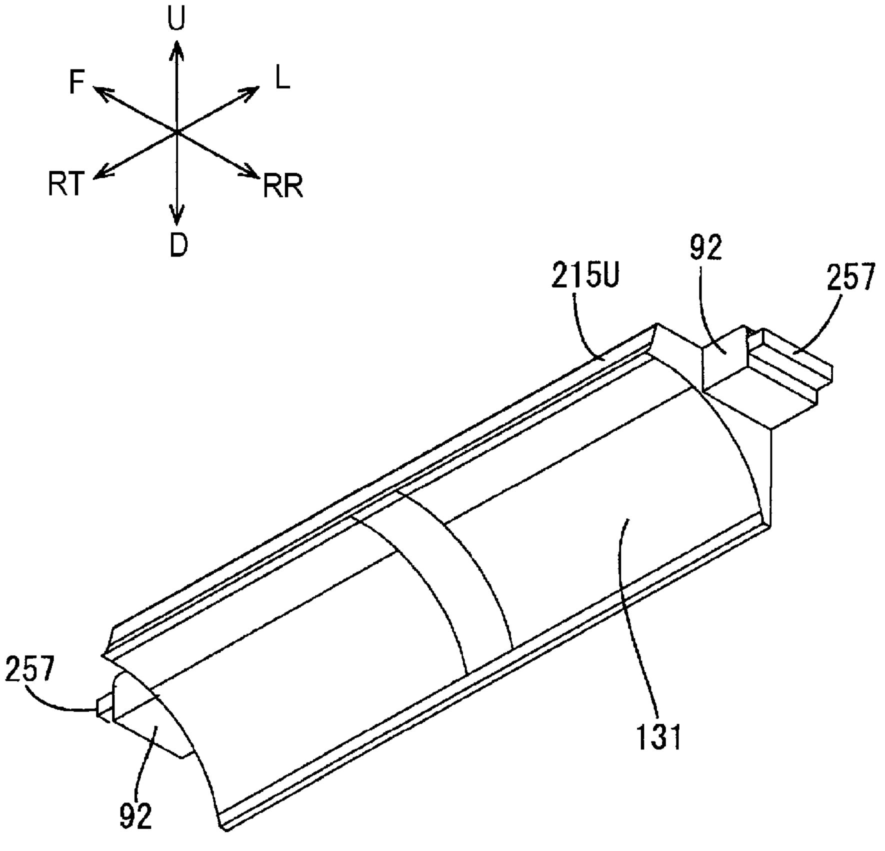
FIG. 21 is a perspective view of an upper forming member when viewed obliquely from a left front side.

As shown in FIG. 21, a lower surface 131 of the upper forming member 215U is formed into a curved surface (concave curved surface). A box-shaped protruding portion 92 protruding leftward is integrally formed on the left side surface of the upper forming member 215U. A guide portion 257 protruding leftward and extending in the front-rear direction is integrally formed on a leftward facing surface of the protruding portion 92. The guide portion 257 is inserted into the upper horizontal groove 89, out of the two horizontal grooves 89 formed in the left wall 222 of the connector housing 211.

A box-shaped protruding portion 92 is similarly integrally formed also on a right side surface. A guide portion 257 protruding rightward and extending in the front-rear direction is integrally formed on a rightward facing surface of the protruding portion 92. The guide portion 257 is inserted into the upper horizontal groove 89, out of the two horizontal grooves 89 formed in the right wall 223 of the connector housing 211.

Figure 22:
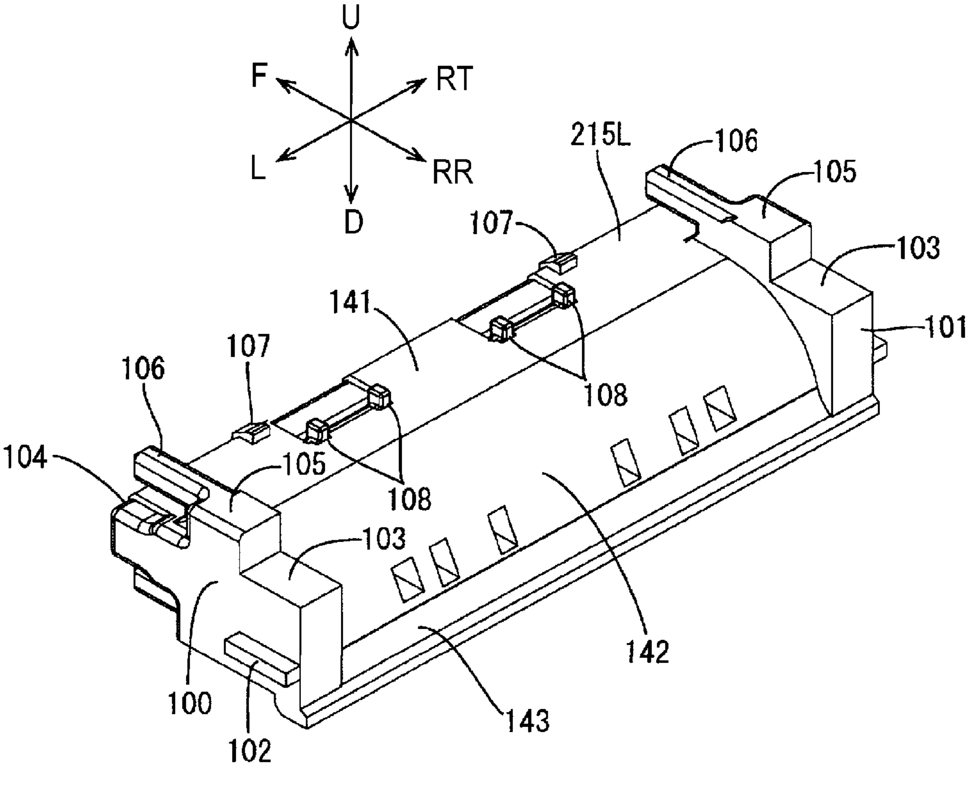
FIG. 22 is a perspective view of a lower forming member when viewed obliquely from the left rear side.

As shown in FIG. 22, the lower forming member 215L is roughly a rectangular parallelepiped long in the lateral direction. As shown in FIG. 23, the upper surface of the lower forming member 215L is composed of a flat surface 141, a curved surface 142 (convex curved surface) curved downward from the rear end of the flat surface 141 and a curved surface 143 (concave curved surface) curved rearward from the rear end of the curved surface 142.

The lower surface of the lower forming member 215L is roughly composed of a flat surface 144, a slant surface 145 inclined downward toward the rear side from the rear end of the flat surface 144, a flat surface 146 extending rearward from the rear end of the slant surface 145, a vertical surface 147 extending downward from the rear end of the flat surface 146 and a flat surface 148 extending rearward from the lower end of the vertical surface 147.

As shown in FIG. 22, a left wall 100 is integrally formed on a left side of the lower forming member 215L, and a right wall 101 is integrally formed on a right side. Since the left wall 100 and the right wall 101 are plane-symmetrically shaped, the left wall 100 is described as an example here.

A guide portion 102 protruding leftward and extending in the front-rear direction is integrally formed on the outer surface of the left wall 100. The guide portion 102 is inserted into the lower horizontal groove 89, out of the two horizontal grooves 89 formed in the left wall 222 of the connector housing 211.

A cut 103 shaped to correspond to the box-shaped protruding portion 92 of the upper forming member 215U is formed in an upper rear corner part of the left wall 222. A cut 104 is also formed in an upper front corner part of the left wall 222. In the left wall 100, a part between the front and rear cuts 104, 103 serves as a protrusion 105 convex upward.

The columnar extending portion 106 extending forward is integrally formed from a substantially right-half and substantially upper-half region of the protrusion 105. The extending portion 106 is inserted into the groove 84 formed in the rear wall 224 of the connector housing 211. In the left wall 100, a substantially front-half region of the upper surface of the front cut 104 is recessed downward.

A pair of engaging projections 107 are formed on a front end part of the upper surface of the lower forming member 215L while being laterally spaced apart. These engaging projections 107 are fit into the third cut 42 from the left and the third cut 42 from the right of the upper flexible cable 212U.

Two projections 108 are formed to the right of the left engaging projection 107 while being laterally spaced apart. These two projections 108 are formed at positions separated rearward from the front end of the lower forming member 215L. A region in front of these two projections 108 is recessed in a range from a position slightly to the left of the left projection 108 to a position slightly to the right of the right projection 108. These two projections 108 are passed through the aforementioned other two recesses 213C, out of the three recesses 213C formed in the reinforcement plate 213 of the upper flexible cable 212U, and the through holes 243 formed in the upper flexible cable 212U in correspondence with those recesses 213C, and fit into the recesses 87 formed in the lower surface of the protruding portion 228 of the rear wall 224 of the connector housing 211. Two projections 108 are also formed to the left of the right engaging projection 107.

Figure 24:
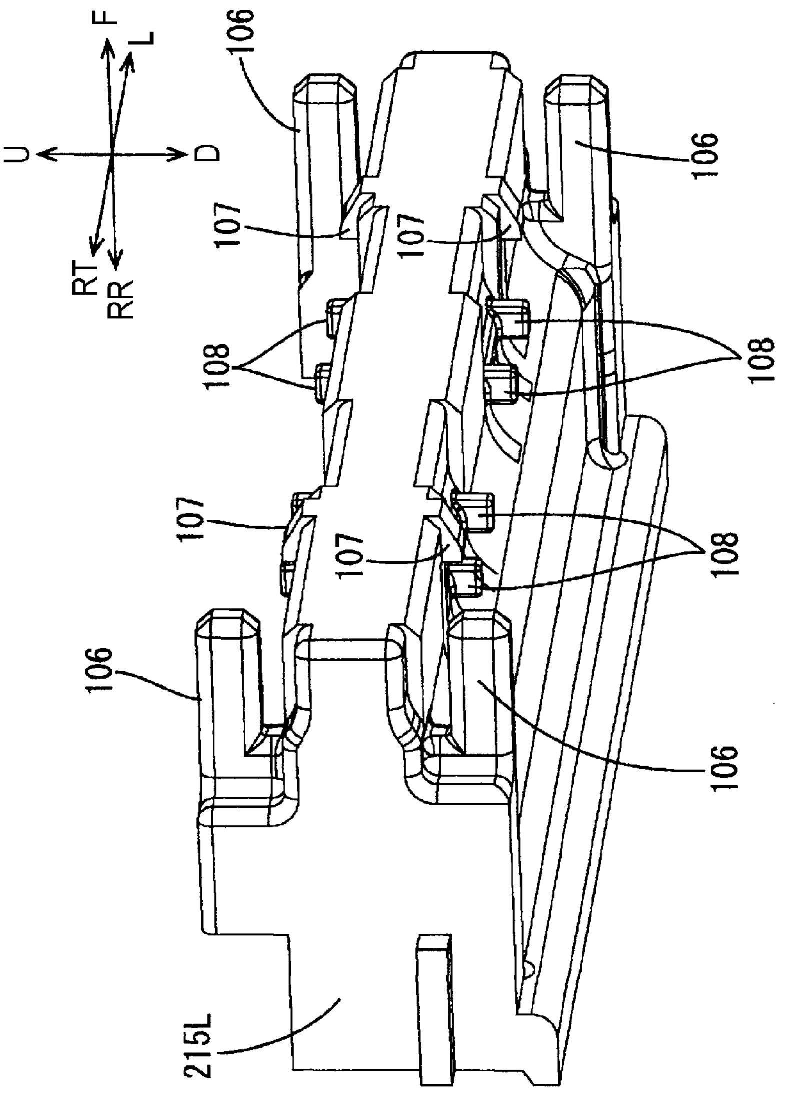
FIG. 24 is a perspective view of the lower forming member when viewed obliquely from a right front side.

As shown in FIG. 24, a front part of the lower forming member 215L is substantially vertically symmetrical. Extending portions 106, engaging projections 107, projections 108 and the like are also formed on the lower surface of the front part of the lower forming member 215L.

(2) Assembling Process of Board Connector

An assembling process of the board connector 201 is described with reference to FIG. 25.

(Step 1) The lower flexible cable 212L and the reinforcement plate 213 are disposed on the extension portion 80 of the connector housing 211.

(Step 2) The upper flexible cable 212U and the reinforcement plate 213 are disposed on the upper surface of the lower forming member 215L.

(Step 3) The lower forming member 215L having the upper flexible cable 212U and the reinforcement plate 213 disposed thereon is mounted into the connector housing 211 from behind.

(Step 4) The upper forming member 215U is disposed above the lower forming member 215L.

(3) Bending of Flexible Cables by Cable Holder

Figure 25:
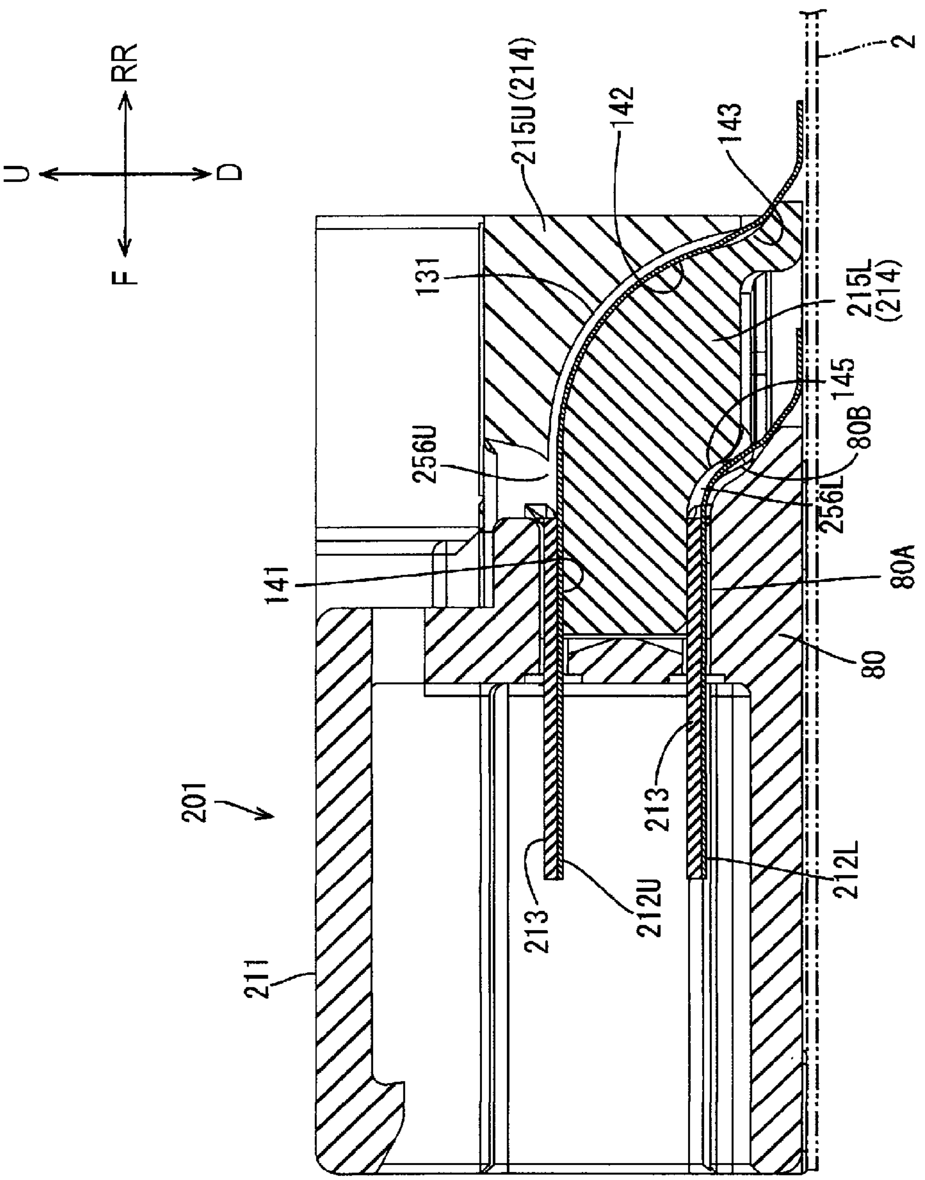
FIG. 25 is a section of the board connector.

As shown in FIG. 25, when the board connector 201 is assembled, the upper flexible cable 212U is obliquely pulled out to a rear lower side (board side) from the board connector 201 along the curved surface 143 of the lower forming member 215L after extending rearward along the flat surface 141 of the lower forming member 215L and being bent downward by passing between the curved surface 131 of the upper forming member 215U and the curved surface 142 of the lower forming member 215L.

The lower flexible cable 212L extends rearward along the flat surface 80A of the extension portion 80, is obliquely bent to the rear lower side (board side) by passing between the slant surface 145 of the lower forming member 215L and the curved surface 80B of the extension portion 80, and is pulled out from the board connector 201.

(4) Effects of Embodiment

According to the board connector 201, a rear part in the connection direction of each flexible cable 212 (more specifically, rear parts in the connection direction of the electrically conductive paths 40) easily contacts the circuit board even if there are the plurality of flexible cables 212.

According to the board connector 201, since the space between the extending portion 80 of the connector housing 211 and the lower forming member 215L is also formed as the cable insertion path 256 (lower cable insertion path 256L), the number of the path forming members 215 can be reduced in the case of forming a plurality of the cable insertion paths 256.

OTHER EMBODIMENTS

The technique disclosed by this specification is not limited to the above described and illustrated embodiments. For example, the following embodiments are also included in a technical scope disclosed by this specification.

(1) Although the board connector is provided with two flexible cables 12 (212) in the above embodiments, the number of the flexible cables 12 (212) is not limited to two and may be one, three or more.

(2) Although the board connector is provided with the reinforcement plates 13 (213) in the above embodiments, the reinforcement plates may not be provided.

(3) Although the flexible cable 12 (212) includes the plurality of electrically conductive paths 40 in the above embodiments, only one electrically conductive path may be included.

(4) Although the connector housing 211 is provided with the extension portion 80 in the second embodiment, the connector housing 211 may not be provided with the extension portion 80.

LIST OF REFERENCE NUMERALS

1: board connector
2: circuit board (example of board)
11: connector housing

12: flexible cable
12L: lower flexible cable
12U: upper flexible cable
13: reinforcement plate
13A: base portion
13B: part
13C: recess
14: cable holder
14A: curved surface
15: fixing member
15A: vertical portion
15B: horizontal portion
20: upper wall
21: bottom wall
21C: recess
22: left wall
23: right wall
24: rear wall
25: rib
26: mounting portion
27: terminal insertion hole
28: protruding portion
28A: part
28B: part
29: engaging portion
30: recess
31: horizontal groove
32: horizontal groove
32A: wall surface
33: vertical groove
34: horizontal groove
35: vertical groove
36: protruding portion
40: electrically conductive path
41: film
41L: lower film
41U: upper film
42: cut
43: through hole
50: right wall
51: path forming portion
52: upper forming portion
52A: rear end part
53: intermediate forming portion
53A: rectangular part
53B: flat plate portion
53C: inclined part
53D: slant surface
53E: step
53F: protrusion
54: lower forming portion
55: through hole
56: guide portion
57: protruding portion
58: protrusion
59: step portion
60: recess
61: engaging portion
62: engaging projection
63: recess
64: engaging arm
64A: engaging projection
70: cable insertion path
70L: lower cable insertion path
70U: upper cable insertion path
80: extension portion
80A: flat surface
80B: curved surface
81: projection
82: recess
83: step portion
84: groove
85: protruding portion
86: projection
87: recess
89: horizontal groove
90: protruding portion
91: groove
92: protruding portion
100: left wall
101: right wall
102: guide portion
103: cut
104: cut
105: protrusion
106: extending portion
107: engaging projection
108: projection
110: part
111: part
112: part
113: slant surface
131: lower surface
141: flat surface
142: curved surface
143: curved surface
144: flat surface
145: slant surface
146: flat surface
147: vertical surface
148: flat surface
201: board connector
211: connector housing
212: flexible cable
212L: lower flexible cable
212U: upper flexible cable
213: reinforcement plate
213A: base portion
213C: recess
214: cable holder
215: path forming member
215L: lower forming member
215U: upper forming member
222: left wall
223: right wall
224: rear wall
228: protruding portion
228A: part
228B: part
243: through hole
256L: lower cable insertion path
256U: upper cable insertion path
257: guide portion

What is claimed is:

1. A board connector to be mounted on a board, comprising:

a connector housing, a mating connector being connected to the connector housing from a direction parallel to a board surface of the board;

a flexible cable including an electrically conductive path extending in a connection direction, a front part in the connection direction of the electrically conductive path being inserted into the connector housing from behind in the connection direction, a rear part in the connection direction of the electrically conductive path being connected to the board; and a cable holder to be mounted on a rear side in the connection direction of the connector housing, the cable holder including a path forming portion for forming a cable insertion path, the flexible cable being inserted into the cable insertion path, wherein the path forming portion includes a slant surface configured such that the flexible cable is obliquely guided toward the board at the slant surface.

2. The board connector of claim 1, comprising a reinforcement plate for reinforcing a front part in the connection direction of the flexible cable.

3. A board connector to be mounted on a board, comprising:

a connector housing, a mating connector being connected to the connector housing from a direction parallel to a board surface of the board;

a flexible cable including an electrically conductive path extending in a connection direction, a front part in the connection direction of the electrically conductive path being inserted into the connector housing from behind in the connection direction, a rear part in the connection direction of the electrically conductive path being connected to the board; and a cable holder to be mounted on a rear side in the connection direction of the connector housing, the flexible cable being curved toward the board side by the cable holder if a side where the board is located with respect to the board connector with the board connector mounted on the board surface is defined as the board side, wherein:

the cable holder is constituted by one member, the cable holder includes a path forming portion for forming a cable insertion path, the flexible cable being inserted into the cable insertion path, and the cable insertion path is entirely open on one side in a direction orthogonal to the connection direction and parallel to the board surface of the board.

4. The board connector of claim 3, comprising a plurality of the flexible cables disposed apart from each other in a vertical direction if a direction orthogonal to the board surface of the board with the board connector mounted on the board is defined as the vertical direction, wherein the cable insertion path is provided for each flexible cable.

5. A board connector to be mounted on a board, comprising:

a connector housing, a mating connector being connected to the connector housing from a direction parallel to a board surface of the board;

a flexible cable including an electrically conductive path extending in a connection direction, a front part in the connection direction of the electrically conductive path being inserted into the connector housing from behind in the connection direction, a rear part in the connection direction of the electrically conductive path being connected to the board; and a cable holder to be mounted on a rear side in the connection direction of the connector housing, the flexible cable being curved toward the board side by the cable holder if a side where the board is located with respect to the board connector with the board connector mounted on the board surface is defined as the board side, wherein the cable holder is composed of a plurality of path forming members disposed apart from each other in a vertical direction and a space between two adjacent ones of the path forming members is formed as the cable insertion path configured such that the flexible cable is inserted thereinto if a direction orthogonal to the board surface of the board with the board connector mounted on the board is defined as the vertical direction.

6. The board connector of claim 5, wherein the connector housing includes an extension portion extending rearward in the connection direction, and a space between the path forming member and the extension portion is also formed as the cable insertion path.

* * * * *